(12) United States Patent
Finkle

(10) Patent No.: US 9,484,794 B2
(45) Date of Patent: Nov. 1, 2016

(54) HYBRID INDUCTION MOTOR WITH SELF ALIGNING PERMANENT MAGNET INNER ROTOR

(71) Applicant: Louis J. Finkle, Lakewood, CA (US)

(72) Inventor: Louis J. Finkle, Lakewood, CA (US)

(*) Notice: Subject to any disclaimer, the term of this patent is extended or adjusted under 35 U.S.C. 154(b) by 785 days.

(21) Appl. No.: 13/689,400

(22) Filed: Nov. 29, 2012

(65) Prior Publication Data

US 2013/0278096 A1     Oct. 24, 2013

Related U.S. Application Data

(63) Continuation-in-part of application No. 13/452,514, filed on Apr. 20, 2012.

(51) Int. Cl.
| | |
|---|---|
| *H02K 21/12* | (2006.01) |
| *H02K 21/46* | (2006.01) |
| *H02K 16/02* | (2006.01) |
| *H02K 17/26* | (2006.01) |
| *H02K 7/108* | (2006.01) |

(52) U.S. Cl.
CPC ............ *H02K 21/46* (2013.01); *H02K 16/02* (2013.01); *H02K 17/26* (2013.01); *H02K 7/108* (2013.01)

(58) Field of Classification Search
USPC ............ 310/156.53, 156.81, 156.83, 156.78, 310/156.24, 156.38
See application file for complete search history.

(56) References Cited

U.S. PATENT DOCUMENTS

| | | |
|---|---|---|
| 2,209,558 A | 7/1940 | Bing et al. |
| 2,209,588 A | 7/1940 | Bing et al. |
| 2,243,616 A | 5/1941 | Bing et al. |
| 2,287,286 A | 6/1942 | Bing et al. |
| 2,558,540 A | 6/1951 | Clos |
| 4,151,431 A | 4/1979 | Johnson |
| 4,285,725 A | 8/1981 | Gysel et al. |
| 4,482,034 A | 11/1984 | Baermann |
| 4,508,998 A | 4/1985 | Hahn |
| 4,578,609 A | 3/1986 | McCarty |
| 4,829,205 A | 5/1989 | Lindgren et al. |
| 5,107,156 A * | 4/1992 | Jaun et al. .................. 310/162 |
| 5,166,654 A | 11/1992 | Doyelle |
| 5,508,576 A | 4/1996 | Nagate et al. |
| 5,594,289 A | 1/1997 | Minato |
| 6,181,047 B1 | 1/2001 | Nitta |

(Continued)

FOREIGN PATENT DOCUMENTS

| | | |
|---|---|---|
| CN | 1360748 | 7/2014 |
| DE | 4421594 | 7/2014 |

(Continued)

*Primary Examiner* — Dang Le
*Assistant Examiner* — Leda Pham
(74) *Attorney, Agent, or Firm* — Kenneth L. Green; Averill & Green

(57) ABSTRACT

A hybrid induction motor includes an inductive rotor and an independently rotating permanent magnet rotor. The inductive rotor is a squirrel cage type rotor for induction motor operation at startup. The permanent magnet rotor is axially displaced and variably coupled to the inductive rotor (or to a motor load) through a clutch and is allowed to rotate independently of the inductive rotor at startup. The independently rotating permanent magnet rotor quickly reaches synchronous RPM at startup. As the inductive rotor approaches or reaches synchronous RPM, the coupling between the inductive rotor and the permanent magnet rotor increases until the two rotors are coupled the synchronous RPM and the motor transitions to efficient synchronous operation.

20 Claims, 34 Drawing Sheets

(56) References Cited

U.S. PATENT DOCUMENTS

| | | | |
|---|---|---|---|
| 6,294,854 B1 * | 9/2001 | Grosspietsch et al. | 310/92 |
| 6,376,959 B1 | 4/2002 | Leupold | |
| 6,771,000 B2 | 8/2004 | Kim et al. | |
| 6,864,773 B2 | 3/2005 | Perrin | |
| 7,459,815 B2 * | 12/2008 | Han | H02K 7/125 |
| | | | 310/114 |
| 7,531,934 B2 * | 5/2009 | Hang | B22D 19/0054 |
| | | | 310/156.56 |
| 7,567,004 B2 | 7/2009 | Smith | |
| 7,741,746 B2 | 6/2010 | Groening | |
| 8,072,108 B2 | 12/2011 | Finkle | |
| 8,097,993 B2 | 1/2012 | Finkle | |
| 8,288,908 B2 | 10/2012 | Finkle et al. | |
| 8,390,162 B2 | 3/2013 | Finkle et al. | |
| 2004/0041481 A1 | 3/2004 | Kuo | |
| 2006/0038457 A1 | 2/2006 | Miyata et al. | |
| 2007/0228856 A1 | 10/2007 | Bates et al. | |
| 2010/0219704 A1 | 9/2010 | Han et al. | |
| 2010/0308674 A1 * | 12/2010 | Kasaoka et al. | 310/114 |
| 2011/0101812 A1 | 5/2011 | Finkle et al. | |

FOREIGN PATENT DOCUMENTS

| | | |
|---|---|---|
| GB | 495813 | 5/1937 |
| JP | S 51-47208 | 4/1976 |
| JP | 62-117558 | 11/1988 |
| JP | 9065591 | 11/1988 |
| JP | 09065591 | 3/1997 |
| JP | H 07-203644 A | 3/1997 |
| JP | 2002-315244 | 10/2002 |
| JP | 2003-088071 | 3/2003 |
| JP | 2003-088071 A | 3/2003 |
| JP | 2004 135377 A | 3/2003 |
| JP | 2004 140978 | 5/2004 |
| JP | 2004-140978 | 5/2004 |
| JP | 2004 336915 A | 11/2004 |
| JP | 2005-210826 | 8/2005 |
| JP | 2005-210826 A | 8/2005 |
| JP | 2006-254638 | 8/2005 |
| JP | 2006-254638 | 9/2006 |
| JP | 2006-254638 A | 9/2006 |
| JP | 2006-352973 A | 9/2006 |
| JP | 2007-503199 | 2/2007 |
| JP | 2008-148455 | 6/2008 |
| JP | 2011-061933 | 3/2011 |
| KR | 10-2005-011667 | 12/2005 |
| KR | 10-2005-0116677 A | 12/2005 |
| WO | WO-88-05976 | 8/1988 |
| WO | WO 88/05976 | 8/1988 |
| WO | WO2004107539 | 12/2004 |

* cited by examiner

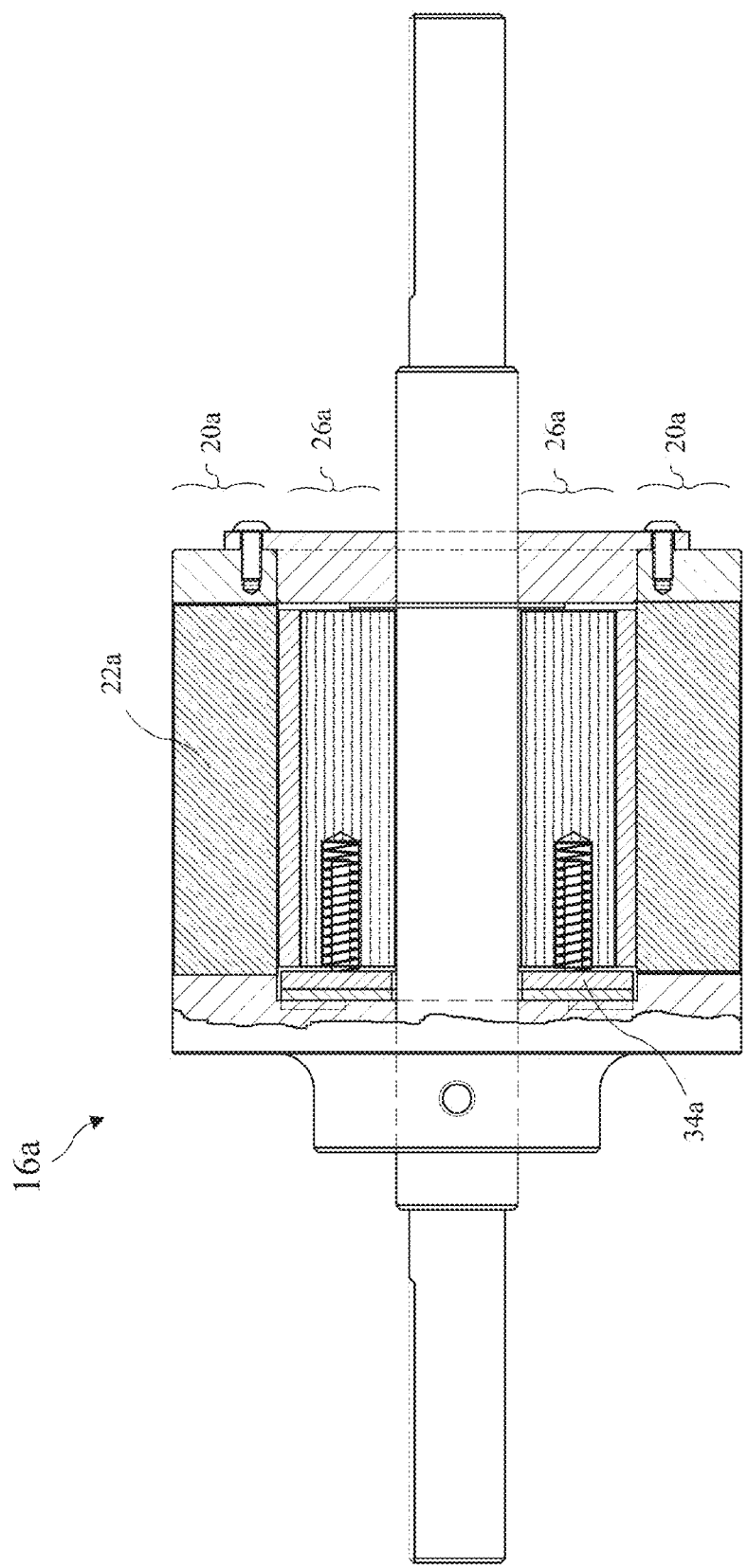

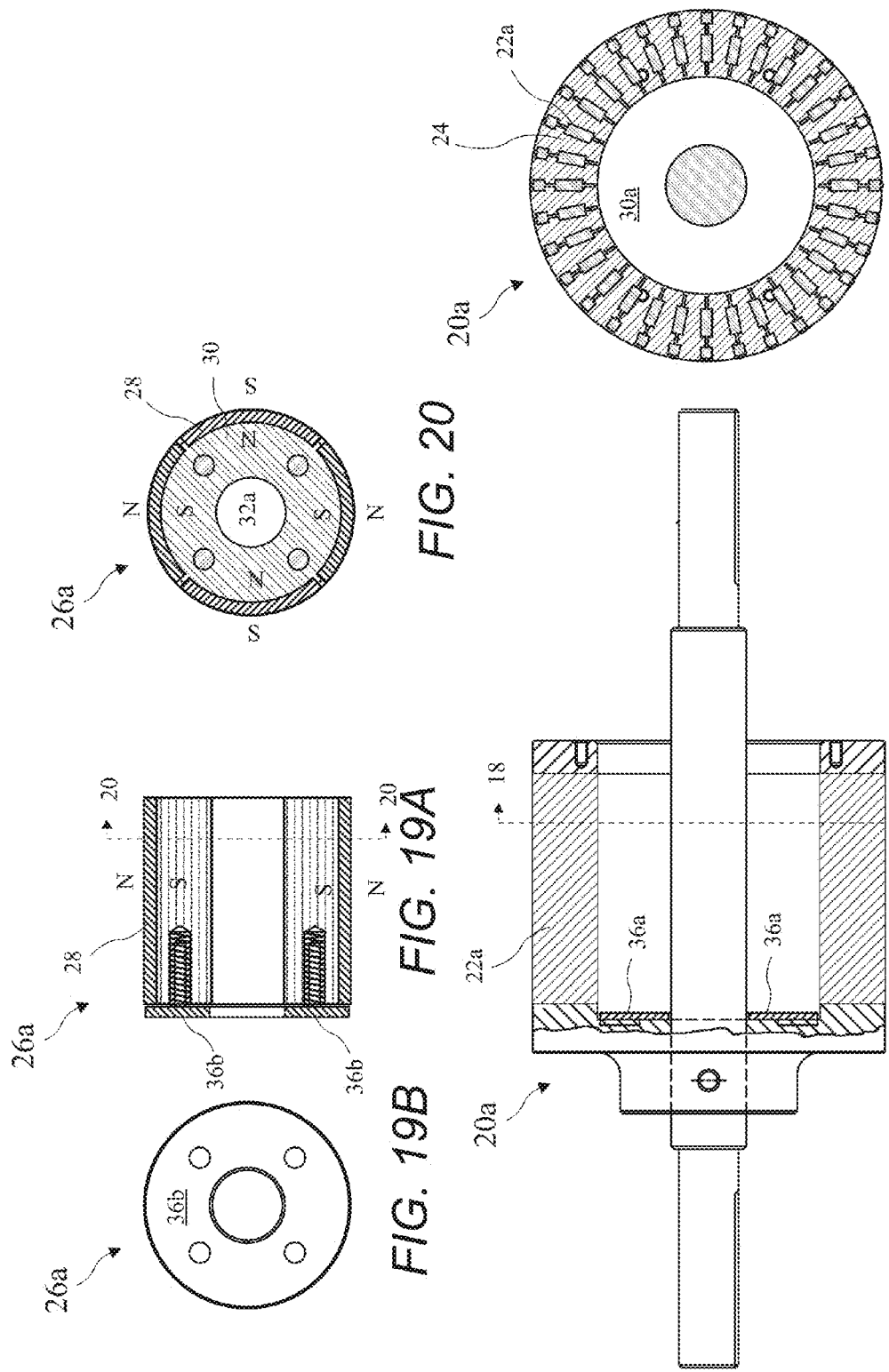

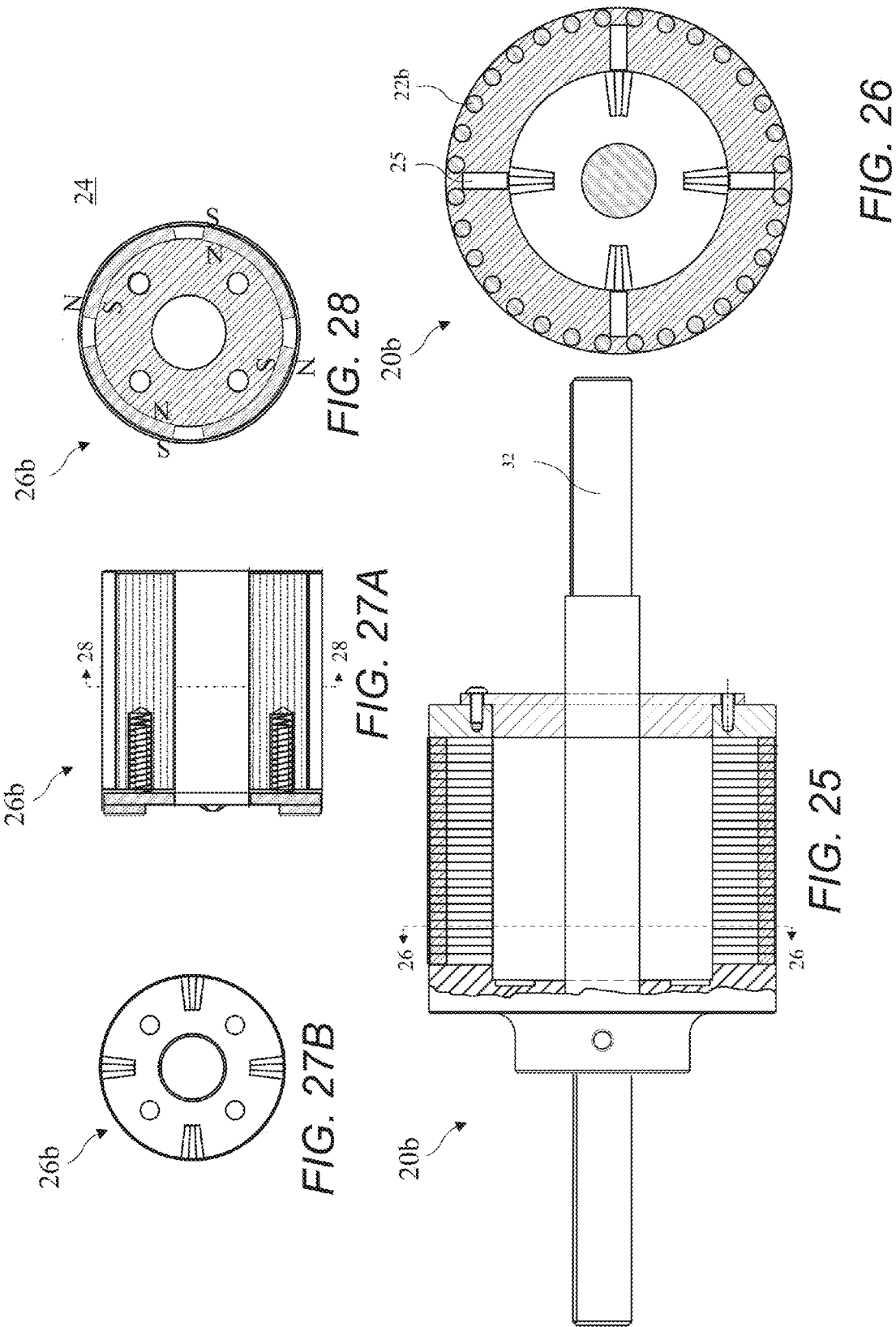

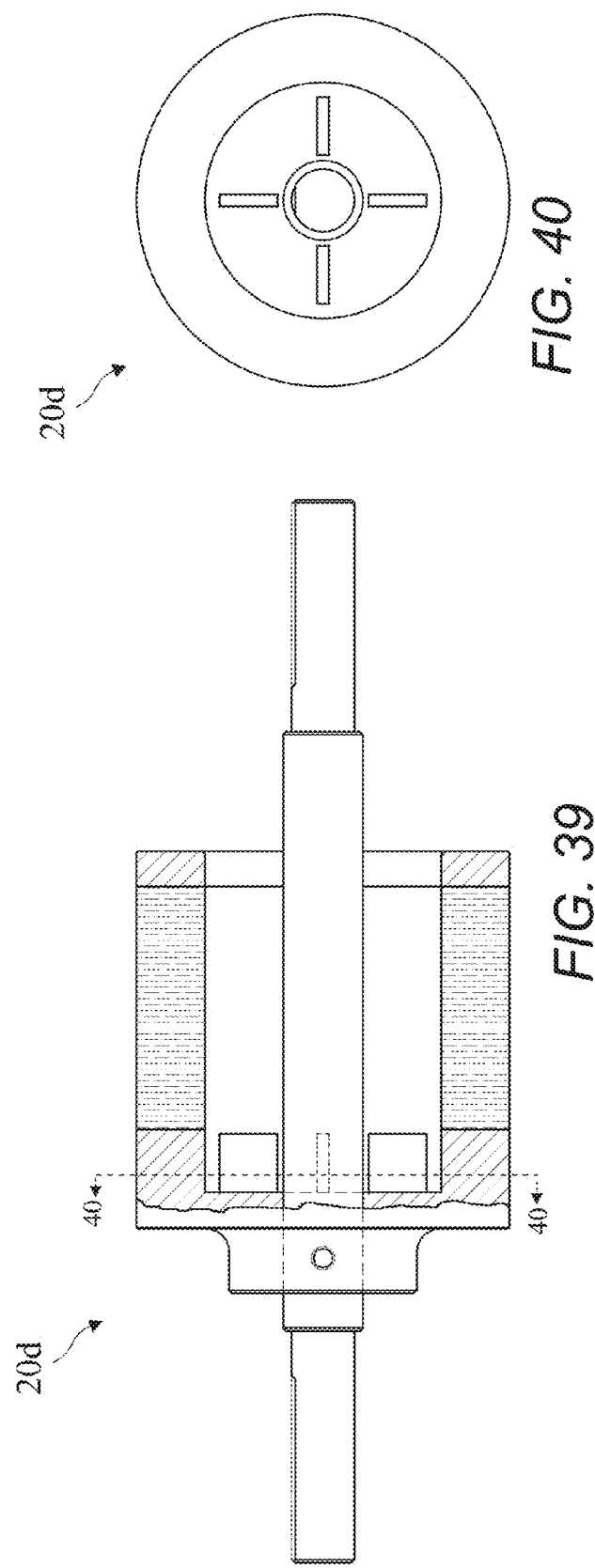
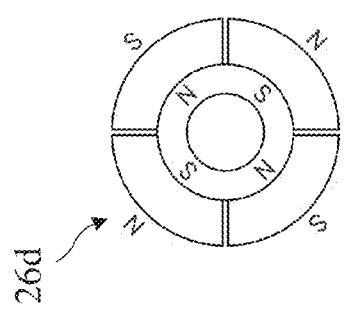
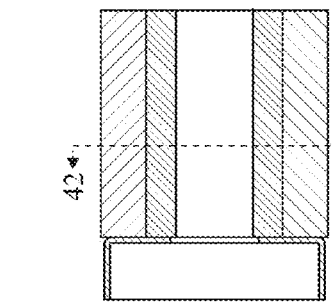

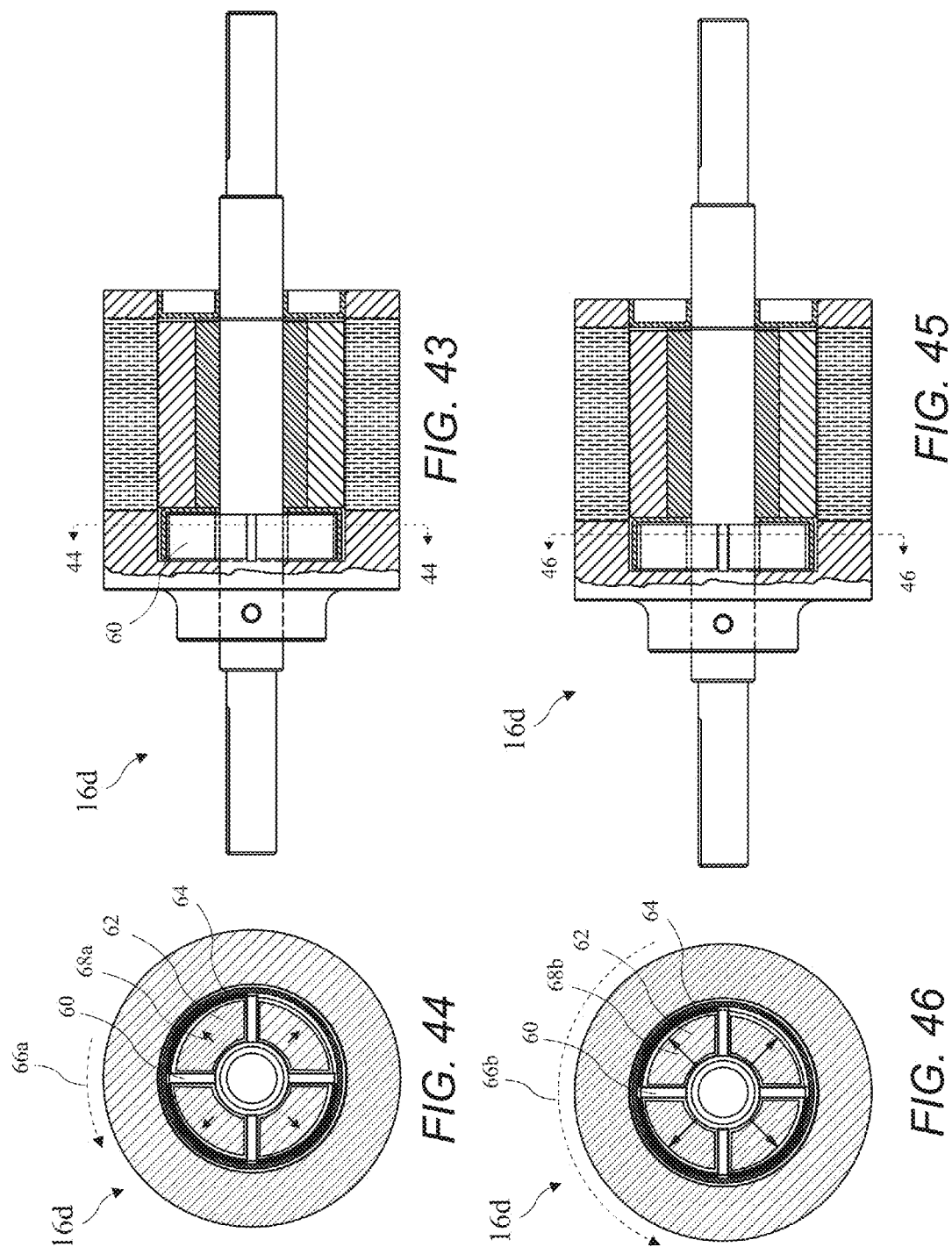

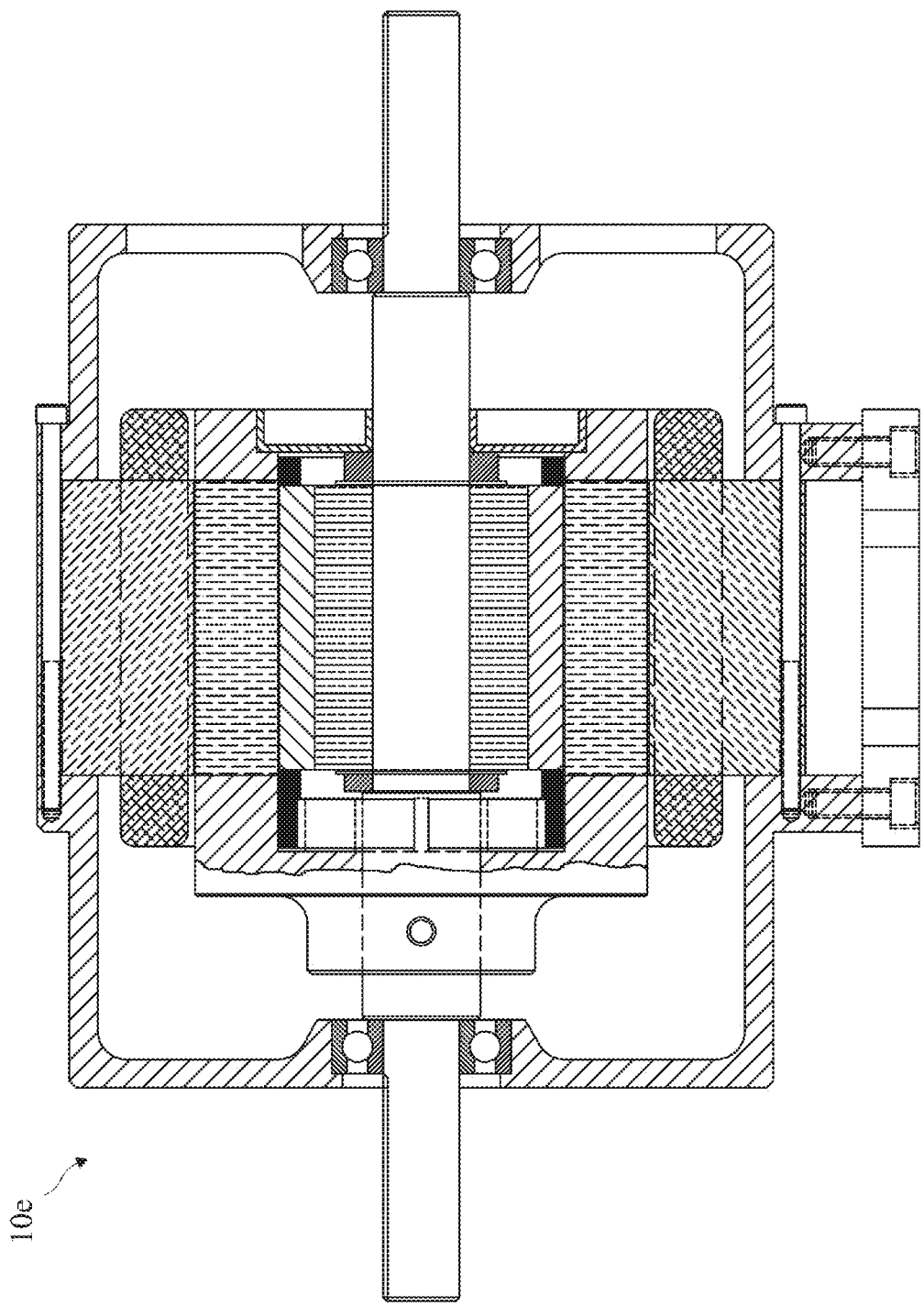

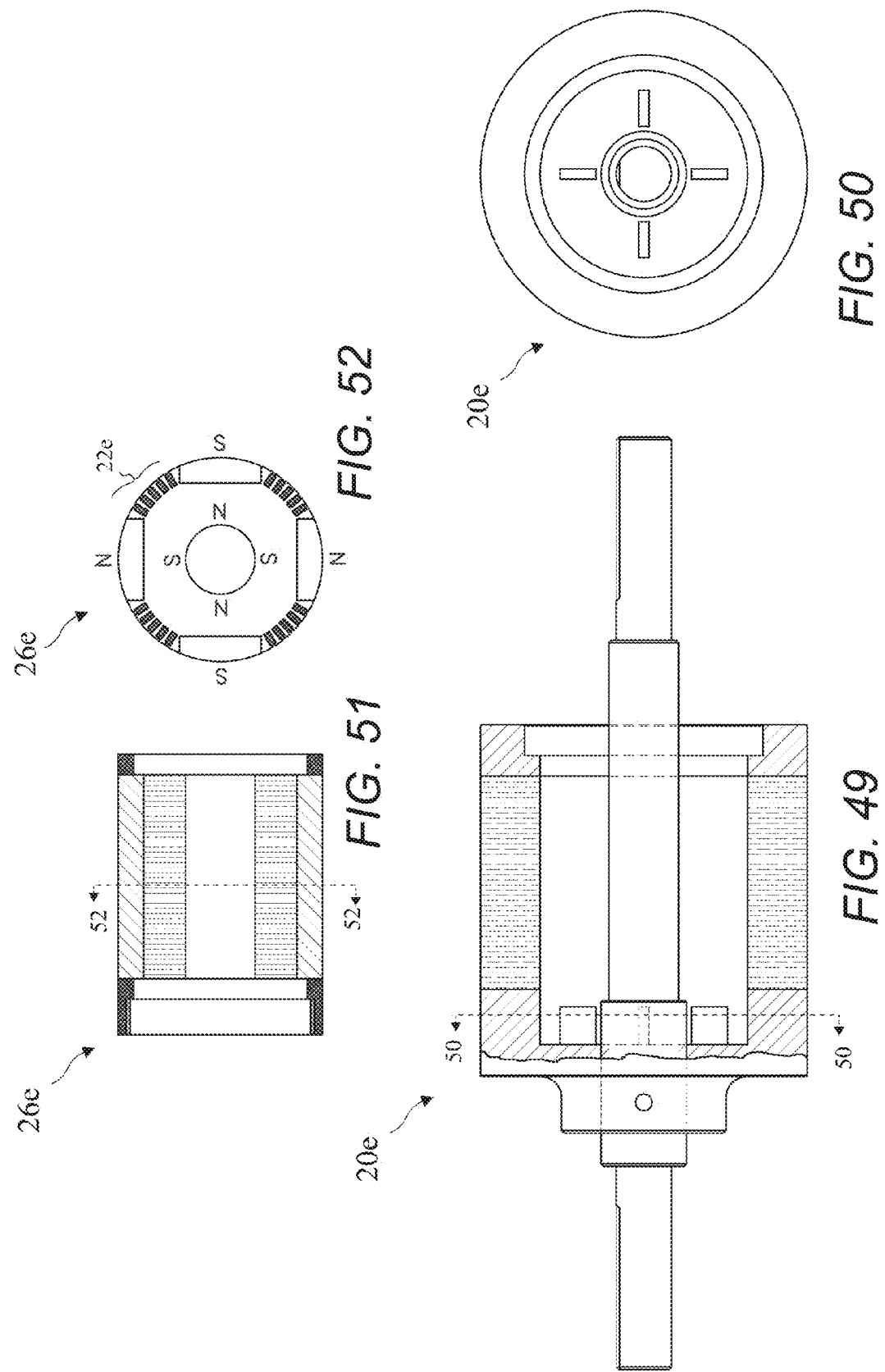

HYBRID INDUCTION MOTOR WITH SELF ALIGNING PERMANENT MAGNET INNER ROTOR

CROSS-REFERENCE TO RELATED APPLICATIONS

The present application is a Continuation In Part of U.S. patent application Ser. No. 13/452,514 filed Apr. 20, 2012, which application is incorporated in its entirety herein by reference.

BACKGROUND OF THE INVENTION

The present invention relates to electric motors and in particular to an induction motor having an independently rotating permanent magnet rotor variably coupled to an inductive rotor to reconfigure the motor from asynchronous induction operation at startup to synchronous operation after startup for efficient operation.

A preferred form of electric motors are brushless AC induction motors. The rotors of induction motors include a cage (or squirrel cage resembling a "hamster wheel") rotating inside a stator. The cage comprises axially running bars angularly spaced apart on the outer perimeter of the rotor. An AC current provided to the stator introduces a rotating stator magnetic field inside the rotor, and the rotating field inductively induces current in the bars. The current induced in the bars creates an induced magnetic field which cooperates with the stator magnetic field to produce torque and thus rotation of the rotor.

The introduction of current into the bars requires that the bars are not moving (or rotating) synchronously with the rotating stator magnetic field because electromagnetic induction requires relative motion (called slipping) between a magnetic field and a conductor in the field. As a result, the rotor must slip with respect to the rotating stator magnetic field to induce current in the bars to produce torque, and the induction motors are therefore called asynchronous motors.

Unfortunately, low power induction motors are not highly efficient at designed operating speed, and are even less efficient under reduced loads because the amount of power consumed by the stator remains constant at such reduced loads.

One approach to improving induction motor efficiency has been to add permanent magnets to the rotor. The motor initially starts in the same manner as a typical induction motor, but as the motor reached its operating speed, the stator magnetic field cooperates with the permanent magnets to enter synchronous operation. Unfortunately, the permanent magnets are limited in size because if the permanent magnets are too large, they prevent the motor from starting. Such size limitation limits the benefit obtained from the addition of the permanent magnets.

BRIEF SUMMARY OF THE INVENTION

The present invention addresses the above and other needs by providing a hybrid induction motor which includes an inductive rotor and an independently rotating permanent magnet rotor. The inductive rotor is a squirrel cage rotor permanently coupled to a motor load (for example, a motor shaft) for induction motor operation at startup. The permanent magnet rotor is variably coupled to the inductive rotor (or to the load) through a clutch and is allowed to rotate independently of the inductive rotor at startup. The independently rotating permanent magnet rotor quickly reaches synchronous RPM at startup. As the inductive rotor approaches or reaches synchronous RPM, the coupling between the inductive rotor and the inner permanent magnet rotor increases until the two rotors are coupled and rotate at the synchronous RPM and the motor transitions to efficient synchronous operation.

In one embodiment, the inner permanent magnet rotor is coupled to the inductive rotor through a discrete position slip clutch providing discrete angular positions of rotational alignment between the permanent magnet rotor and the inductive rotor In accordance with one aspect of the invention, there is provided a hybrid induction motor including an outer inductive rotor and a freely rotating inner permanent magnet rotor free to rotate with rotating stator flux. When power is applied to the motor, the inner permanent magnet rotor immediately accelerates to keep up with the rotating stator field, while the outer inductive rotor and load comes up to speed. As the outer inductive rotor approaches synchronous RPM (the RPM of the stator magnetic field and of the inner permanent magnet rotor) a locking clutch engages, synchronizing the outer inductive rotor inner with the inner permanent magnet rotor. The locking clutch locks at just over the designed torque of the motor, any over load will unlock the clutch and begin to slip until the load is brought back to near synchronous speed. The clutch locks are designed to skip at a certain frequency just out of working slip and engage within operating frequency.

In accordance with another aspect of the invention, there is provided a hybrid induction motor including an inner permanent magnet rotor coupled with the rotating stator magnetic field. The inner permanent magnet rotor reaches synchronous RPM before outer inductive rotor only needing to overcome initial friction of the slip clutch (clutch torque is set to peak torque of motor rating) and inertia of inner permanent magnet rotor itself.

In accordance with still another aspect of the invention, there is provided an outer inductive rotor including amortisseur windings which accelerates as a normal induction motor rotor without any negative permanent magnet influence or transient breaking torque and benefitting from a positive applied torque provided by the inner permanent magnet rotor through the slip clutch which contributes to the starting torque. Such amortisseur windings provide torque without fluctuation or pulsation inherent in fixed Line Start Permanent Magnet (LSPM) motors during starting In accordance with yet another aspect of the invention, there is provided a hybrid induction motor which is self regulating and avoids magnetic overload and stall if to much load is applied. As the motor approaches magnetic overload or stall, the permanent magnet rotor disengages from the inductive rotor and maintains synchronous RPM, The inductive and permanent magnet rotors re-couple when the transient event is past.

In accordance with still another aspect of the invention, there is provided a hybrid induction motor which can safely use ferrite magnets because the clutch mechanism does not expose the magnets to high coercive demagnetizing forces because the clutch allows the permanent magnet rotor to rotate at synchronous speed until excessive load is brought under control.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 16 shows a more detailed side view of a first rotor of the first embodiment of the motor according to the present invention.

FIG. 17 shows a side view of a first inductive rotor of the first embodiment of the motor according to the present invention.

FIG. 18 shows a cross-sectional view of the first inductive rotor of the first embodiment of the motor according to the present invention.

FIG. 19A shows a side view of a first permanent magnet rotor of the first embodiment of the motor according to the present invention.

FIG. 19B shows an end view of the first permanent magnet rotor of the first embodiment of the motor according to the present invention.

FIG. 20 shows a cross-sectional view of the first permanent magnet rotor of the first embodiment of the motor according to the present invention taken along line 20-20 of FIG. 19A.

FIG. 25 shows a side view of a second inductive rotor of the second embodiment of the motor according to the present invention.

FIG. 26 shows a cross-sectional view of the second inductive rotor of the second embodiment of the motor according to the present invention.

FIG. 27A shows a side view of a second permanent magnet rotor of the second embodiment of the motor according to the present invention.

FIG. 27B shows an end view of the second permanent magnet rotor of the second embodiment of the motor according to the present invention.

FIG. 28 shows a cross-sectional view of the second permanent magnet rotor of the second embodiment of the motor according to the present invention taken along line 28-28 of FIG. 27A.

FIG. 39 shows a side view of a fourth inductive rotor of the fourth embodiment of the motor according to the present invention.

FIG. 40 shows a cross-sectional view of the fourth inductive rotor of the fourth embodiment of the motor according to the present invention.

FIG. 41 shows a side view of a fourth permanent magnet rotor of the fourth embodiment of the motor according to the present invention.

FIG. 42 shows a cross-sectional view of the fourth permanent magnet rotor of the fourth embodiment of the motor according to the present invention taken along line 42-42 of FIG. 41.

FIG. 43 shows a side view of the fourth rotor at low RPM with the centrifugal clutch slipping;

FIG. 44 shows a cross-sectional view of the fourth rotor taken along line 44-44 of FIG. 43.

FIG. 45 shows a side view of the fourth rotor at high RPM with the centrifugal clutch engaged;

FIG. 46 shows a cross-sectional view of the fourth rotor taken along line 46-46 of FIG. 45.

FIG. 47 shows a side view of a fifth embodiment of the motor according to the present invention.

FIG. 49 shows a side view of a fifth inductive rotor of the fifth embodiment of the motor according to the present invention.

FIG. 50 shows a cross-sectional view of the fifth inductive rotor of the fifth embodiment of the motor according to the present invention.

FIG. 51 shows a side view of a fifth permanent magnet rotor of the fifth embodiment of the motor according to the present invention.

FIG. 52 shows a cross-sectional view of the fifth permanent magnet rotor of the fifth embodiment of the motor according to the present invention taken along line 52-52 of FIG. 51.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Arrangements of Inductive and Permanent Magnet Rotors

Figure 1:
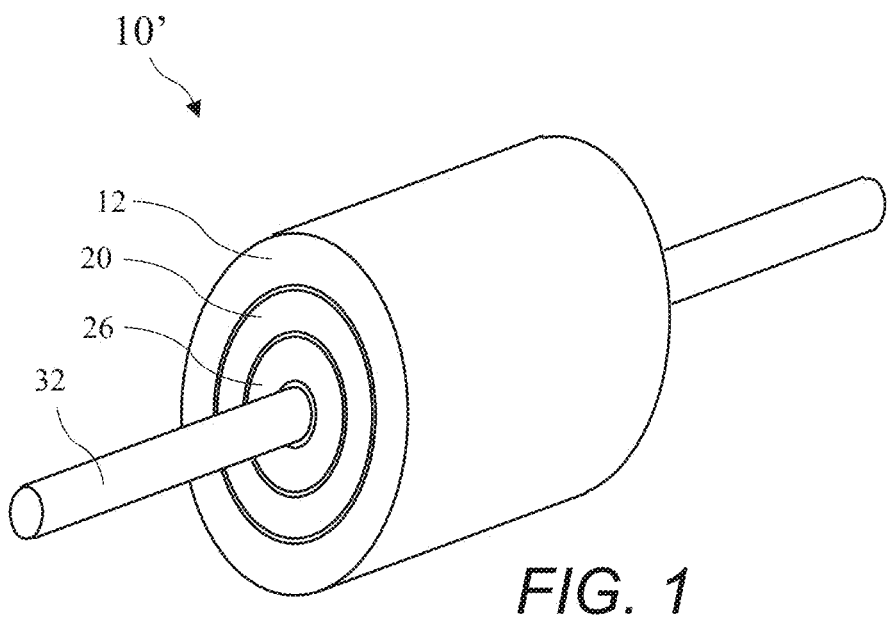
FIG. 1 shows an embodiment of an electric motor configuration having an independently rotating inner permanent magnet rotor, an inductive rotor fixedly coupled to a motor shaft and outside the permanent magnet rotor, and a stator outside the inductive rotor, according to the present invention.

A first electric motor configuration 10' having an independently rotating inner permanent magnet rotor 26, an inductive rotor 20 coupled to a motor shaft 32 (or other load) and outside the permanent magnet rotor 26, and a stator 12 outside the inductive rotor 20, according to the present invention is shown in FIG. 1. The independently rotating inner permanent magnet rotor 26 is variably coupled to the inductive rotor 20. The variably coupling allows the independently rotating inner permanent magnet rotor 26 to rotationally accelerate to synchronous speed very quickly at motor 10' startup, independently of the inductive rotor 20 which is connected to a load and rotationally accelerates slower than the inner permanent magnet rotor 26. The variably coupling may be in the form of a slip clutch, a centrifugal clutch, or an electrically controlled clutch as described in the following paragraphs. Once the inductive rotor 20 approached synchronous speed, the inductive rotor 20 and the permanent magnet rotor 26 lock into synchronous operation and a squirrel cage in the inductive rotor 20 ceases to generate current due to the lack of slippage between the rotating stator magnetic field and the bars of the squirrel cage, and the motor 10' operates as an efficient permanent magnet motor.

Figure 2:
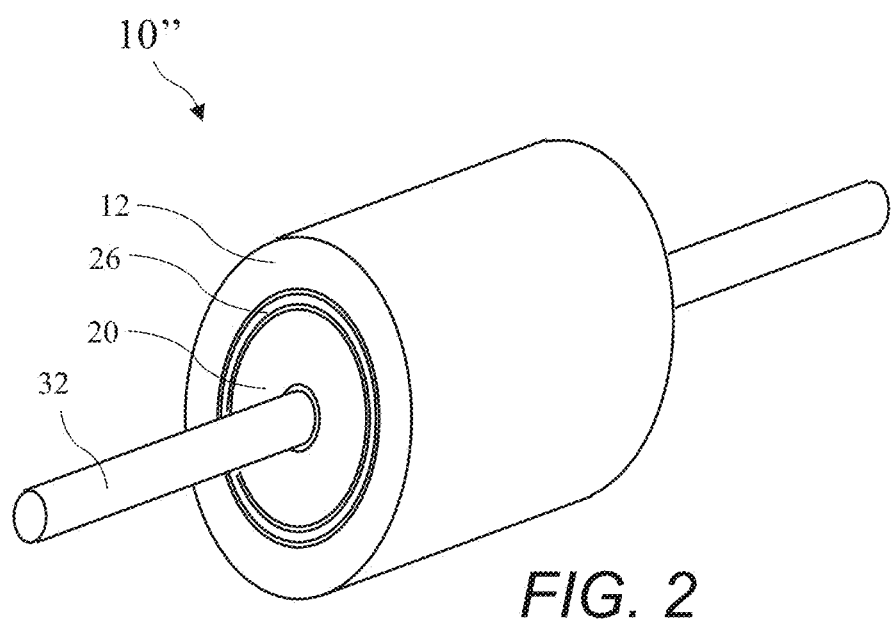
FIG. 2 shows an embodiment of an electric motor configuration having the inductive rotor coupled to a motor shaft, the independently rotating permanent magnet rotor outside the inductive rotor, and the stator outside the permanent magnet rotor, according to the present invention.

A second electric motor configuration 10" having the inductive rotor 20 coupled to a motor shaft 32, the independently rotating permanent magnet rotor 26 outside the inductive rotor, and the stator 12 outside the independently rotating permanent magnet rotor 26, according to the present invention, is shown in FIG. 2. The electric motor configuration 10" is similar in principle to the electric motor configuration 10', with the exception that the permanent magnet rotor 26 resides outside the inductive rotor 20 (i.e., is between the inductive rotor 20 and the stator 12. The permanent magnet rotor 26 preferably comprises a ring magnet.

Figure 3:
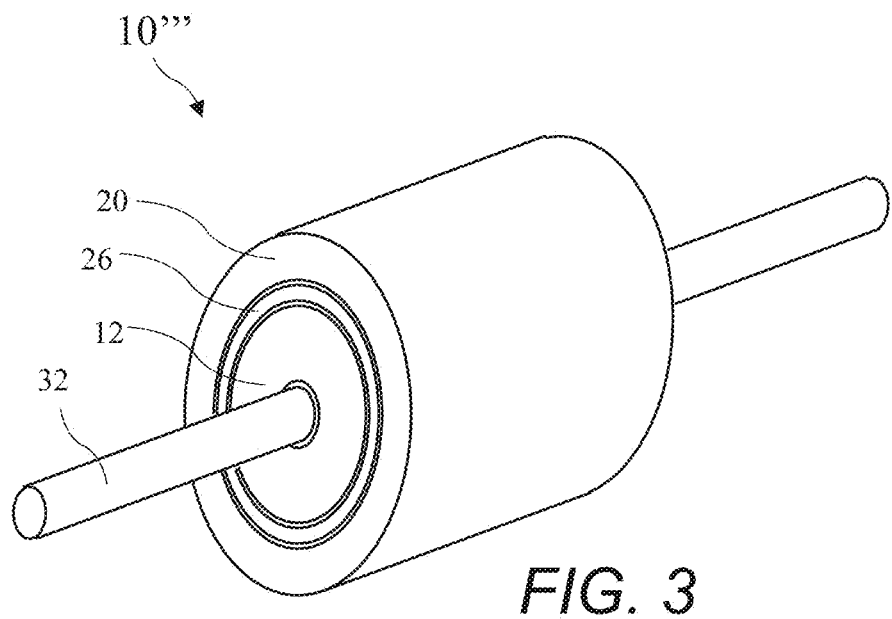
FIG. 3 shows an embodiment of an electric motor configuration having the stator inside the rotors, the independently rotating permanent magnet rotor outside the stator, and the inductive rotor coupled to a load and outside the permanent magnet rotor and the stator, according to the present invention.

A third electric motor configuration 10''' having the stator 12 inside the rotors 20 and 26, the independently rotating permanent magnet rotor 26 outside the stator 12, and the inductive rotor 20 coupled to a load and outside the permanent magnet rotor 26 and stator 12, according to the present invention, is shown in FIG. 3. The electric motor configuration 10''' is similar in principle to the electric motor configuration 10', with the exception that the stator 12 is inside both rotors 20 and 26, and the permanent magnet rotor 26 is preferably a ring magnet residing between the stator 12 and inductive rotor 20.

Figure 4:
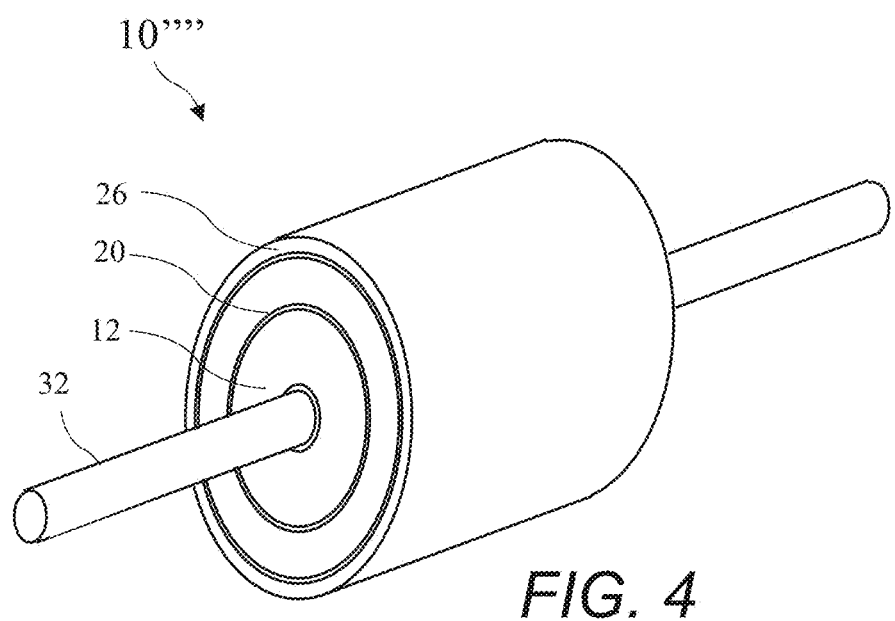
FIG. 4 shows an embodiment of an electric motor configuration having the stator inside the rotors, the inductive rotor coupled to a load and outside the stator, and independently rotating permanent magnet rotor outside the inductive rotor, according to the present invention.

A fourth electric motor configuration 10'''' having the stator 12 inside the rotors 20 and 26, the inductive rotor 20 coupled to a load and outside the stator 12, and independently rotating permanent magnet rotor 26 outside the inductive rotor 20, according to the present invention is shown in FIG. 4. The electric motor configuration 10'''' is similar in principle to the electric motor configuration 10', with the exception that the stator 12 is inside both rotors 20 and 26, and the permanent magnet rotor 26 resides outside the inductive rotor 20. The permanent magnet rotor 26 preferably comprises a ring magnet.

Figure 5:
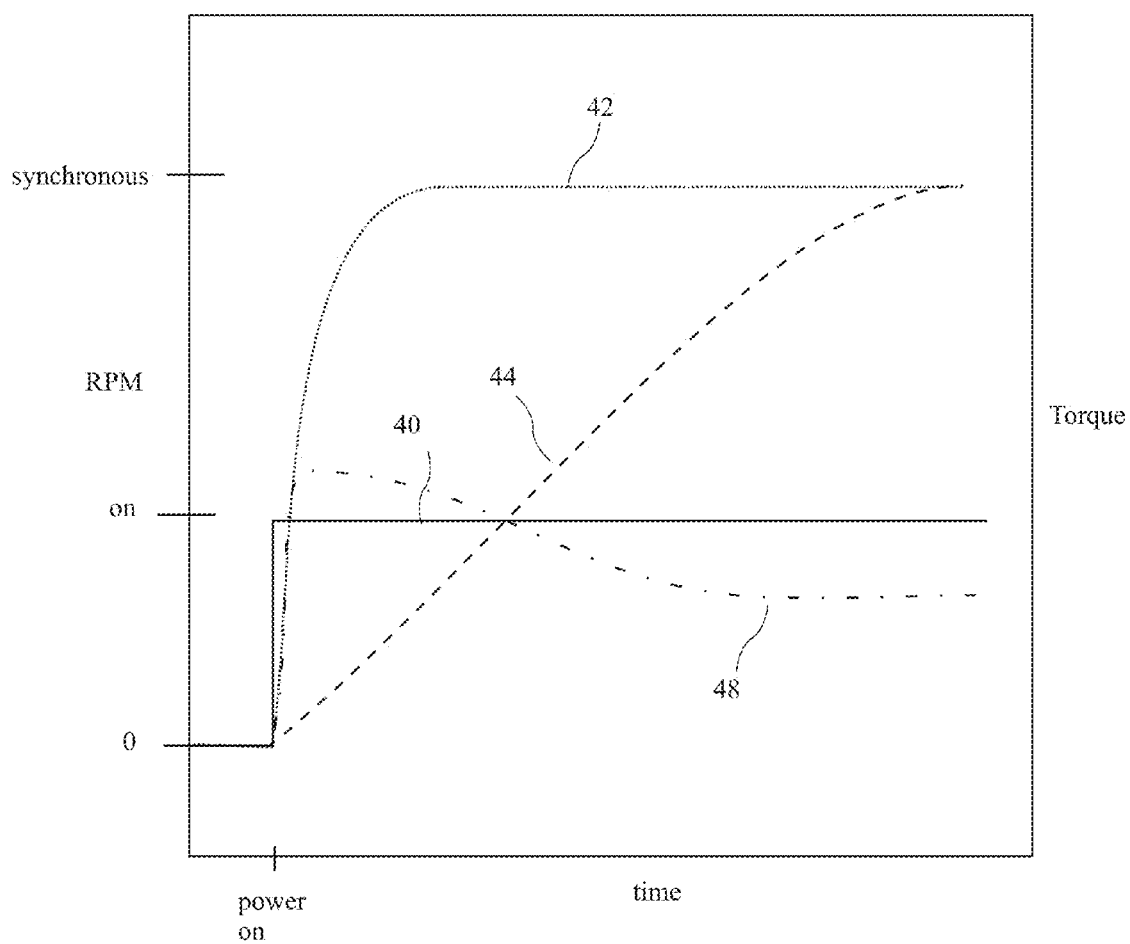
FIG. 5 shows the relative RPM and torque of the inductive and permanent magnet rotors.

The relative RPM and torque of the inductive rotor 20 and permanent magnet rotor 26 at motor startup is shown in FIG. 5. The permanent magnet rotor torque 48 rises very quickly when power 40 is applied allowing the permanent magnet rotor 26 overcome any connection and to break loose from the inductive rotor 20 and the permanent magnet rotor RPM 42 quickly reach synchronous RPM. As the RPM 44 of the inductive rotor approached synchronous RPM and the torque 48 drops, the permanent magnet rotor 26 and inductive rotor 20 lock into synchronous RPM and the motor converts to highly efficient permanent magnet operation.

Figure 6:
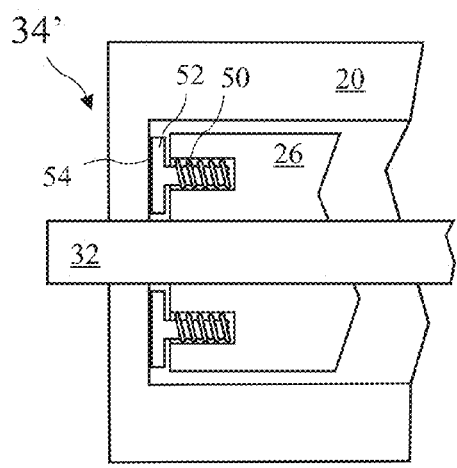
FIG. 6 shows a side view of a continuous slip clutch according to the present invention.
Figure 7:
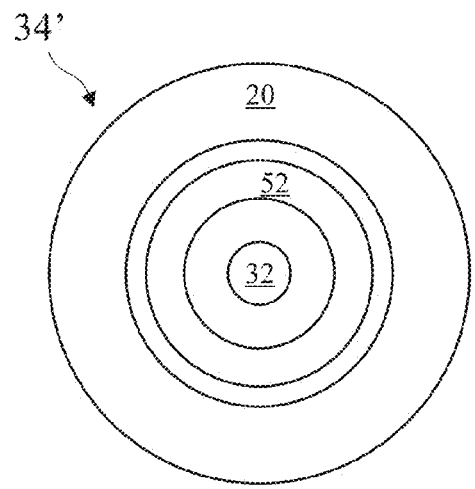
FIG. 7 shows an end view of the continuous slip clutch according to the present invention.

Embodiments of Clutches which Variably Couple the Inductive and Permanent Magnet Rotors A side view of a continuous slip clutch 34' according to the present invention is shown in FIG. 6 and an end view of the continuous slip clutch 34' is shown in FIG. 7. The continuous slip clutch 34' includes an annular plate 52 carried by the permanent magnet rotor 26 and pushed against an annular friction surface 54 of the induction rotor 20 by springs 50. The continuous slip clutch 34' provides a constant kinetic friction with the springs 50 selected to allow the permanent magnet rotor 26 to break loose from the induction rotor at startup when the permanent magnet rotor torque 48 (see FIG. 5) peaks, and allows the two rotors 20 and 26 to lock into synchronous RPM when the permanent magnet rotor torque 48 drops.

Figure 8:
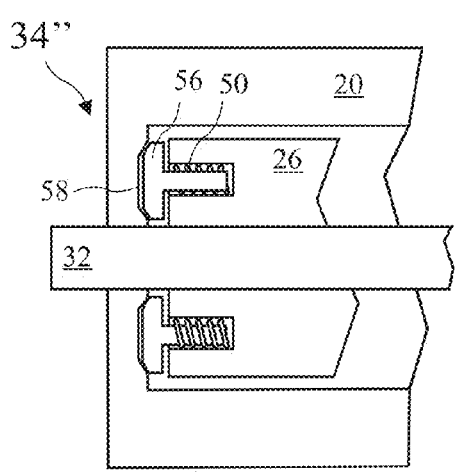
FIG. 8 shows a side view of a discrete slip clutch according to the present invention.
Figure 9:
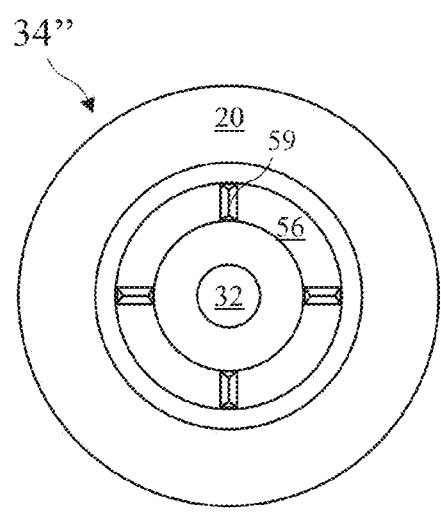
FIG. 9 shows an end view of the discrete slip clutch according to the present invention.

A side view of a discrete slip clutch 34'' according to the present invention is shown in FIG. 8 and an end view of the discrete slip clutch 34'' is shown in FIG. 9. The discrete slip clutch 34'' includes uniformly spaced apart teeth 59 on an annular plate 56 and cooperating grooves 58 to cause the discrete slip clutch 34'' to lock into a selected relationship between the permanent magnet rotor 26 and induction rotor 20 to align poles of the rotor with the stator magnetic field. Such discrete alignment is preferred when the rotor has small number of poles, for example, four poles.

Figure 10:
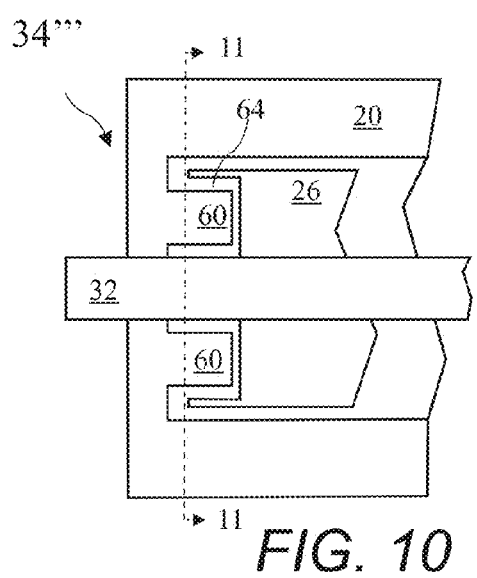
FIG. 10 shows a side view of a centrifugal clutch coupling the permanent magnet rotor and the inductive rotor according to the present invention.
Figure 11:
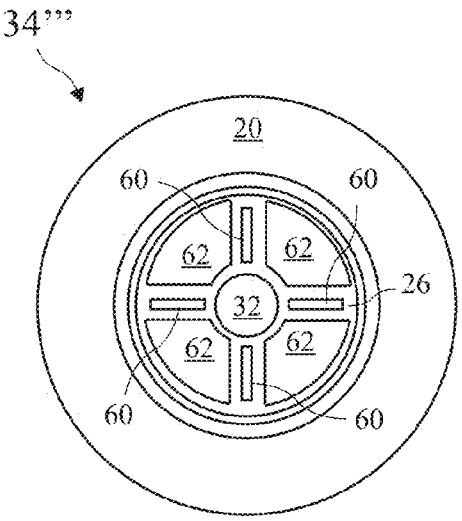
FIG. 11 shows a cross-sectional view of the centrifugal clutch coupling the permanent magnet rotor and the inductive rotor taken along line 11-11 of FIG. 10 according to the present invention.

A side view of a centrifugal clutch 34''' coupling the permanent magnet rotor 26 and the inductive rotor 20 according to the present invention is shown in FIG. 10 and a cross-sectional view of the centrifugal clutch 34''' coupling the permanent magnet rotor 26 and the inductive rotor 20 taken along line 11-11 of FIG. 10 is shown in FIG. 11. Vanes 60 attached to the inductive rotor 20 reach into a concave cylindrical mouth 64 on one end of the permanent magnet rotor 26. Centrifugal masses 62 reside between the vanes 60 and are held to rotate with the inductive rotor 20. As the rotational speed of the inductive rotor 20 approaches synchronous speed, the masses 62 are pushed against a cylindrical inner face of the mouth 64 locking the rotation of the permanent magnet rotor 26 to the rotation of the inductive rotor 20.

Figure 12:
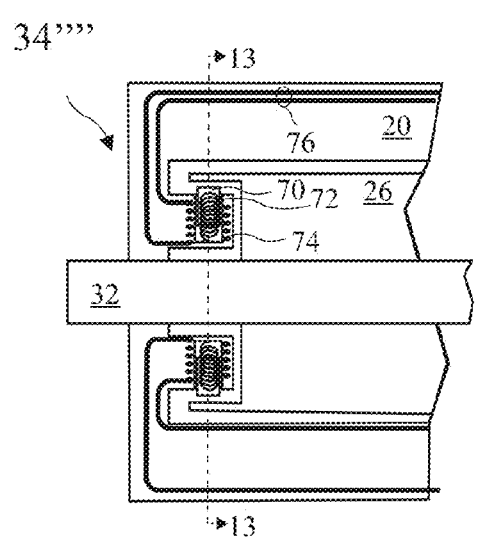
FIG. 12 shows a side view of an electro-magnetic clutch coupling the permanent magnet rotor and the inductive rotor according to the present invention.
Figure 13:
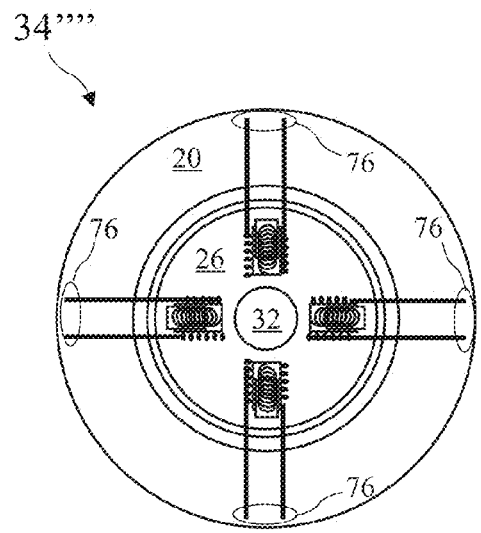
FIG. 13 shows a cross-sectional view of the electro-magnetic clutch coupling the permanent magnet rotor and the inductive rotor taken along line 13-13 of FIG. 12 according to the present invention.

A side view of an electro-magnetic clutch 34'''' coupling the permanent magnet rotor 26 and the inductive rotor 20 according to the present invention is shown in FIG. 12 and a cross-sectional view of the electro-magnetic clutch 34'''' coupling the permanent magnet rotor 26 and the inductive rotor 20 taken along line 13-13 of FIG. 11 is shown in FIG. 13. The electro-magnetic clutch 34'''' includes coils (or solenoids) 74 receiving current through inductive windings 76 in the inductive rotor 20. The coil 74 pulls clutch shoes 70 away from the cylindrical inner face of the mouth 64 and spring 72 push the shoes towards the cylindrical inner face of the mouth 64. The shoes 70 may further include masses similar to the masses 62 in FIG. 11 to add to the engagement against the cylindrical inner face of the mouth 64 as the inductive rotor RPM increases. The current produced by the windings 76 is proportional to the difference between the inductive rotor RPM and the synchronous RPM, thus disengaging the electro-magnetic clutch 34''' at startup and engaging the electro-magnetic clutch 34''' as the inductive rotor RPM approaches synchronous RPM.

Motor Designs Embodying the Present Invention

Figure 15:
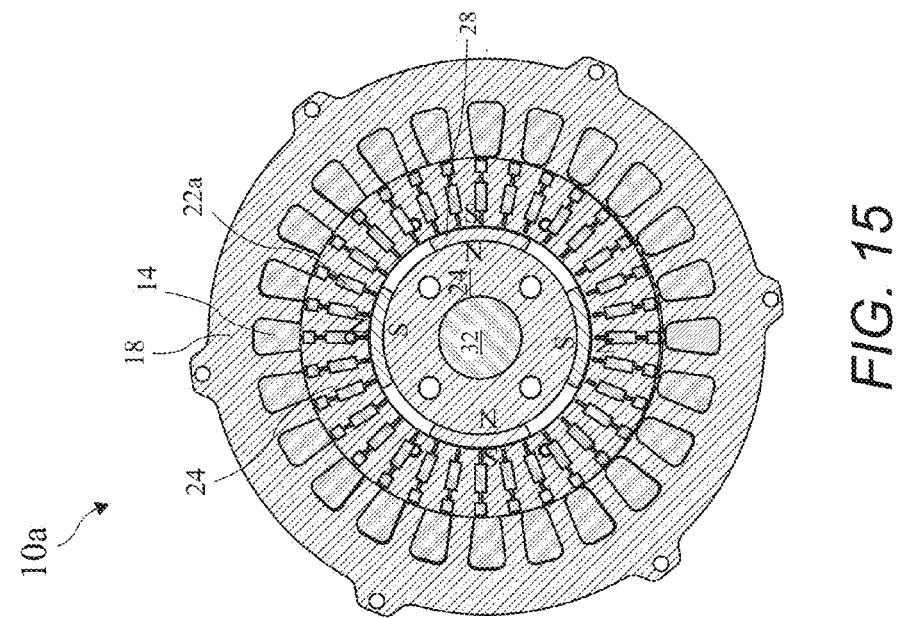
FIG. 15 shows a cross-sectional view of the first embodiment of the motor according to the present invention.
Figure 14:
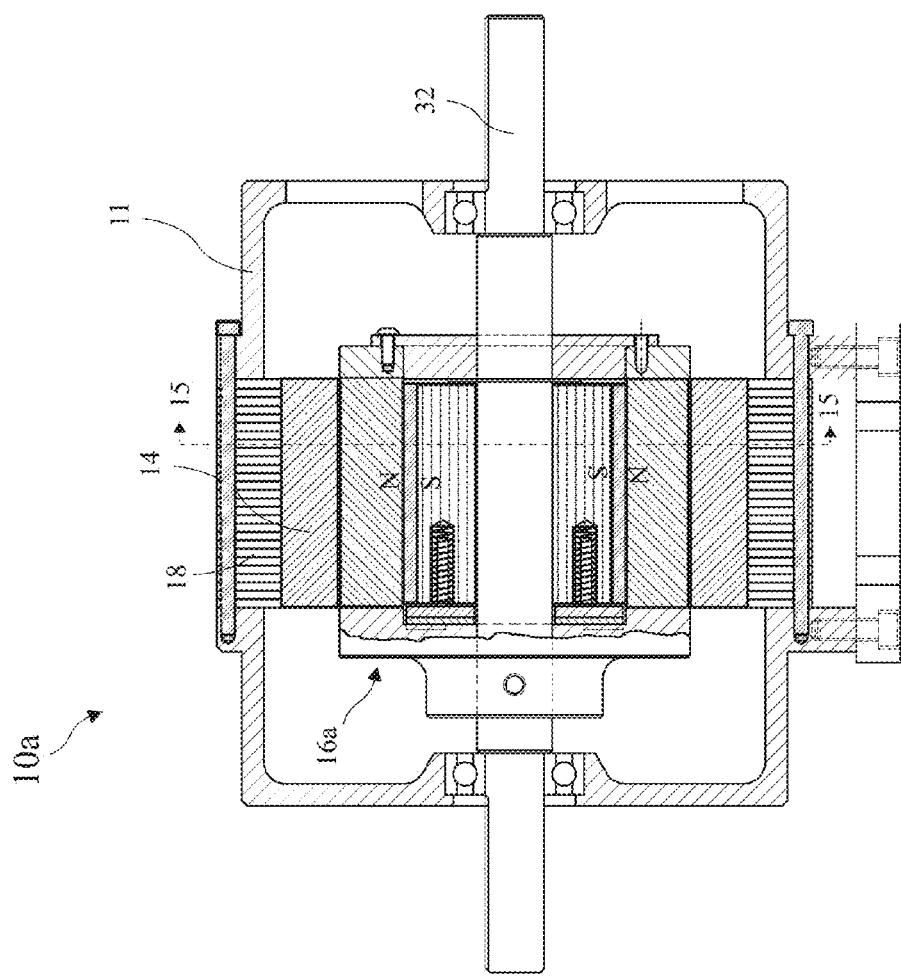
FIG. 14 shows a side view of a first embodiment of a motor according to the present invention.
Figure 21:
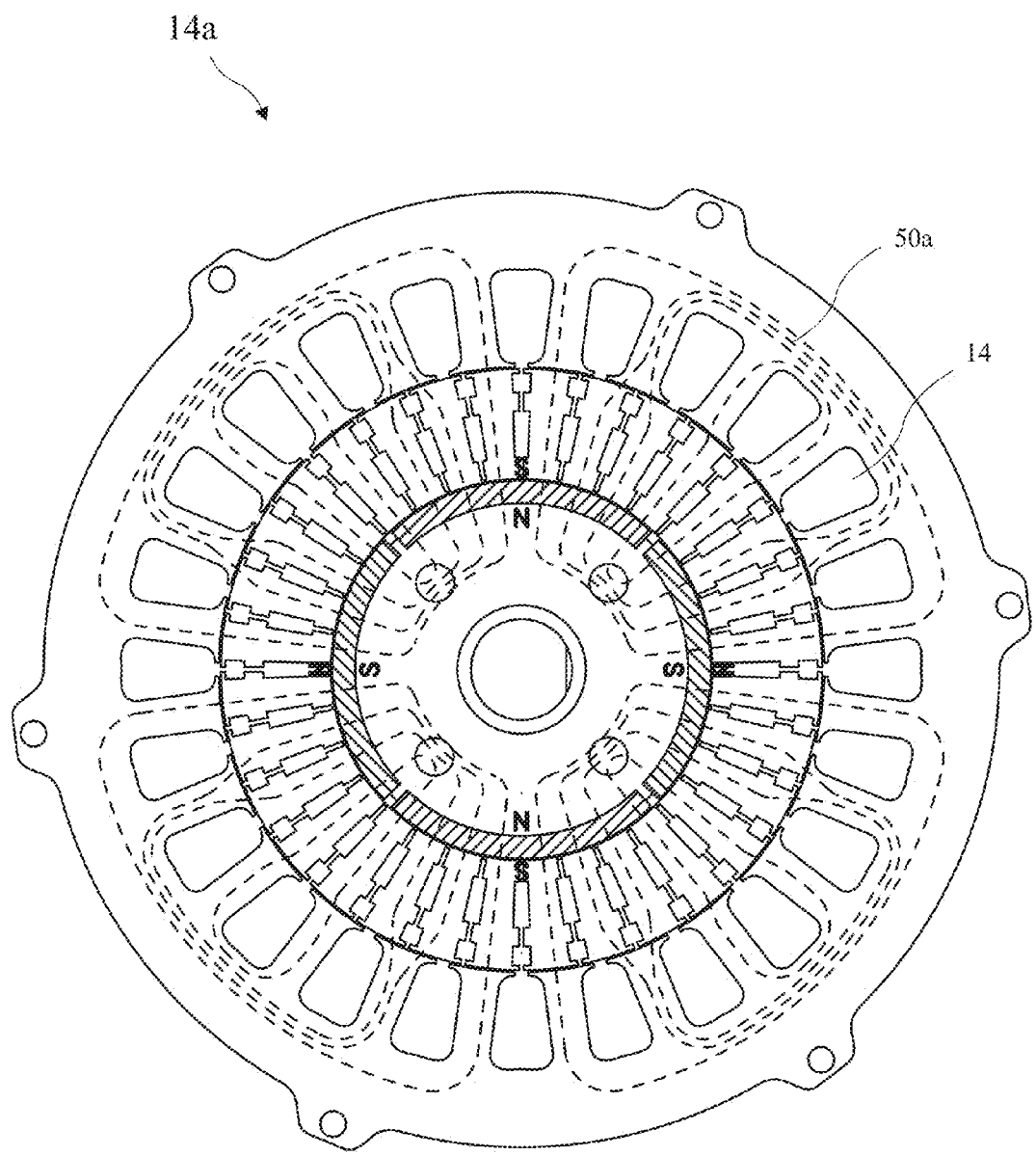
FIG. 21 shows first stator magnetic field lines of the first embodiment of the motor according to the present invention.

A side view of a first motor 10a according to the present invention is shown in FIG. 14, a cross-sectional view of the first motor 10a is shown in FIG. 15, a more detailed side view of the rotor of the first motor 10a is shown in FIG. 16, a side view of the inductive rotor 20a of the first motor 10a is shown in FIG. 17, a cross-sectional view of the inductive rotor 20a of the first motor 10a is shown in FIG. 18, a side view of the permanent magnet rotor 26a of the first motor 10a is shown in FIG. 19A, an end view of the permanent magnet rotor 26a of the first motor 10a is shown in FIG. 19B, a cross-sectional view of the permanent magnet rotor 26a of the first motor 10a is shown in FIG. 20, and the stator magnetic field 50a of the first motor 10a is shown in FIG. 21. The Motor 10a includes a housing 11, stator windings 14, and stator back iron 18. The inductive rotor 20a includes bars 22a reaching nearly the entire depth of the inductive rotor 20a to avoid flux leakage and extend the stator magnetic field 32 into the permanent magnet rotor 26a. The motor 10a includes a clutch 34a which may be a clutch 34', 34'', 34''', or 34''.

Figure 23:
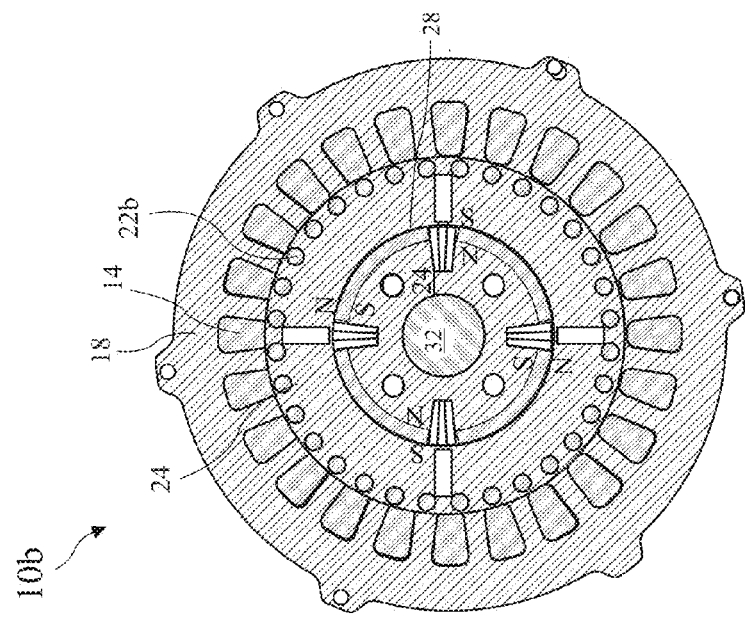
FIG. 23 shows a cross-sectional view of the second embodiment of the motor according to the present invention.
Figure 22:
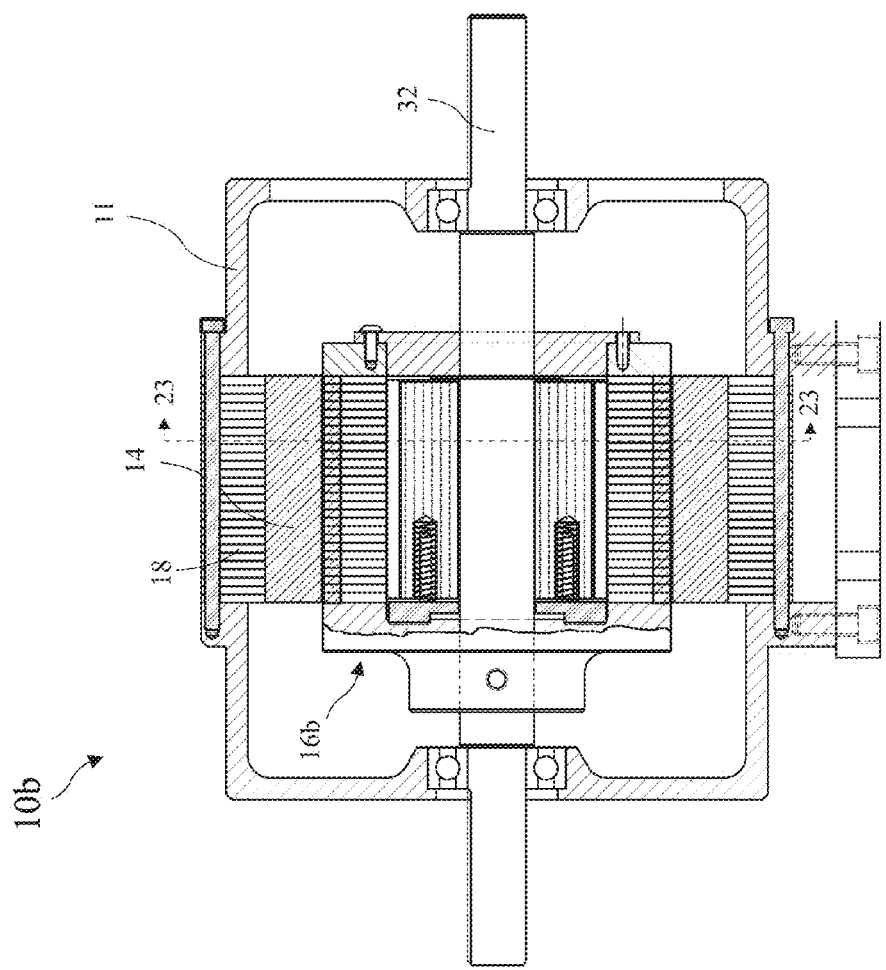
FIG. 22 shows a side view of a second embodiment of the motor according to the present invention.
Figure 24:
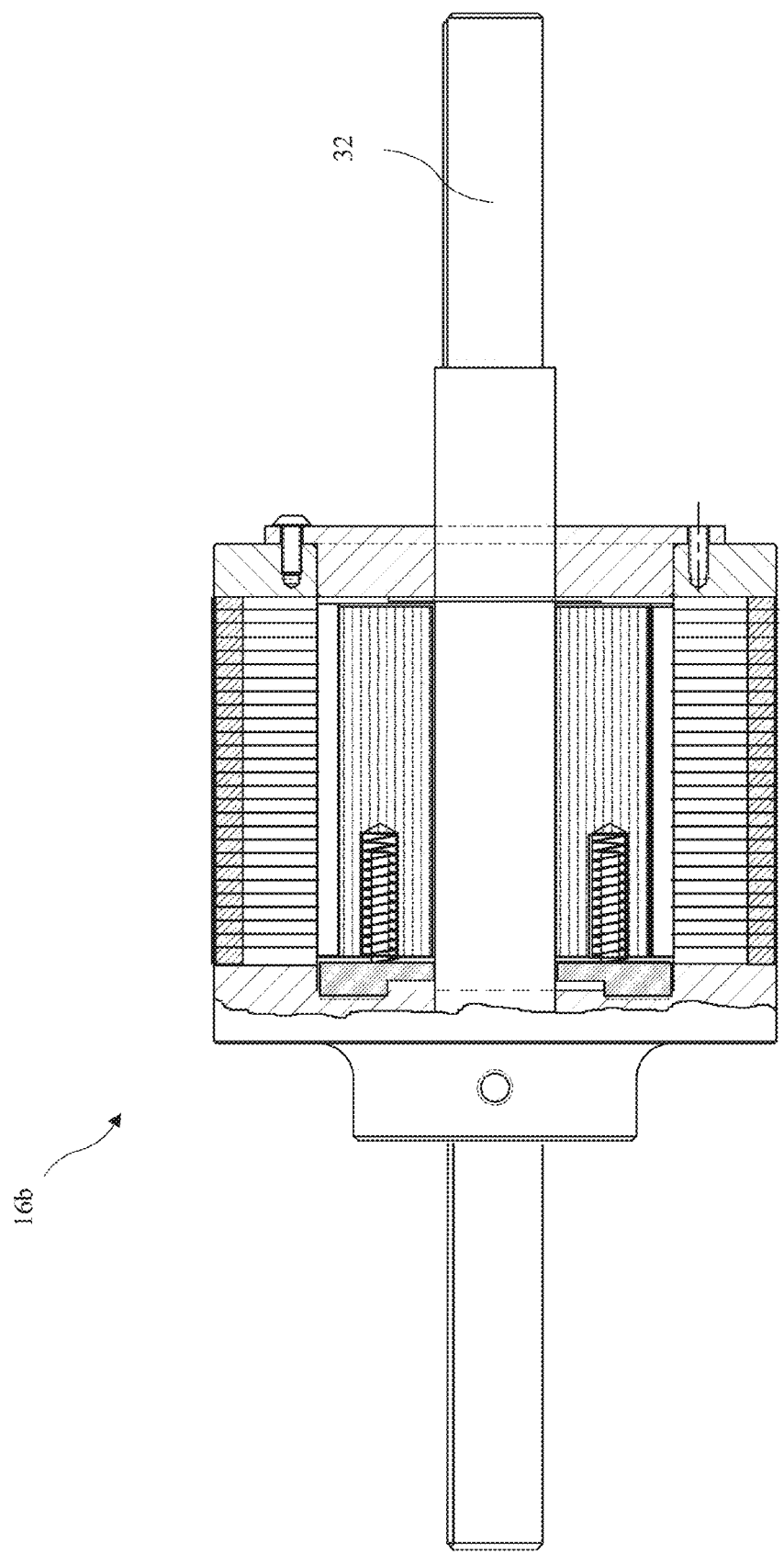
FIG. 24 shows a detailed side view of a second rotor of the second embodiment of the motor according to the present invention.
Figure 29:
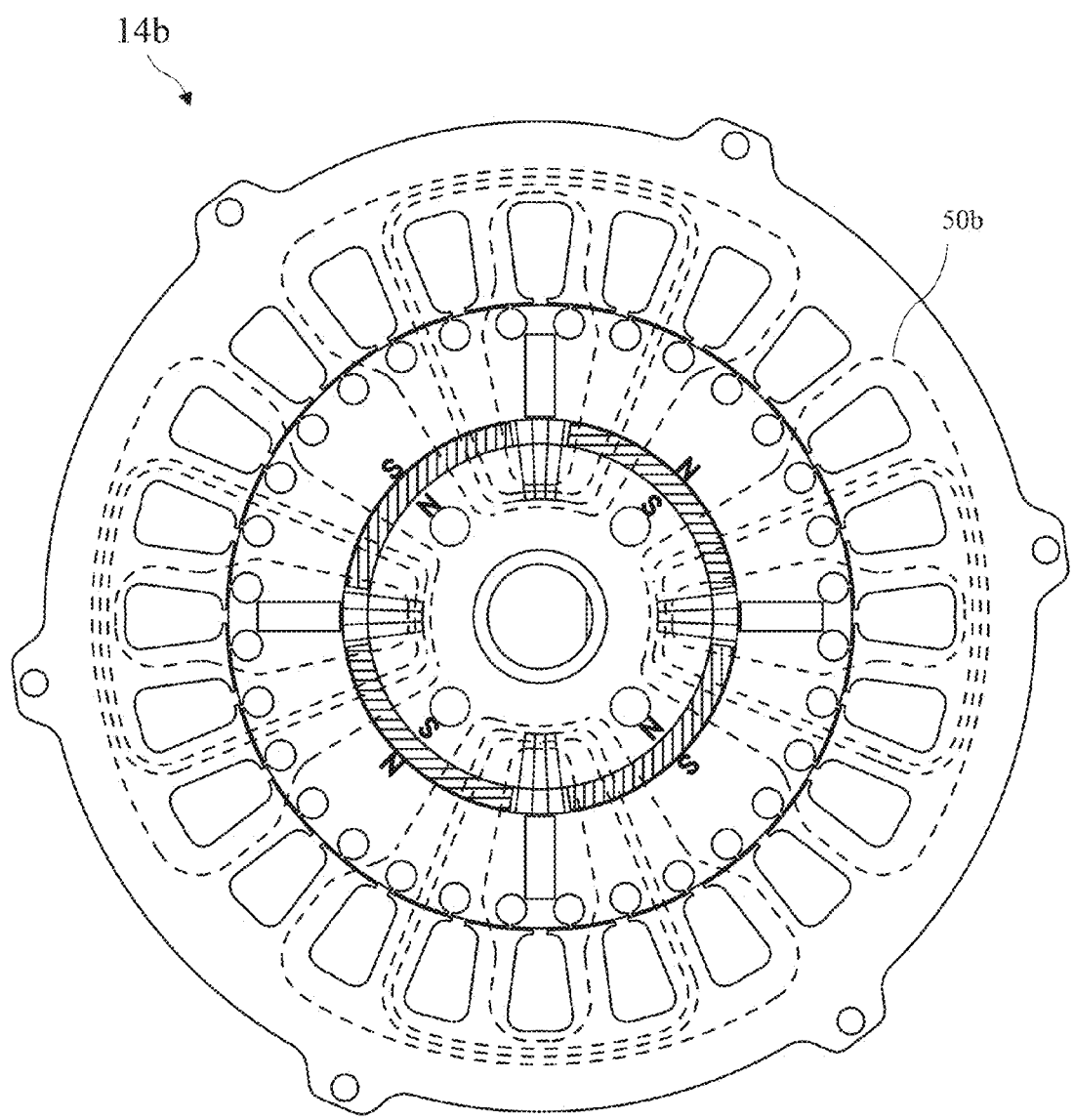
FIG. 29 shows stator magnetic field lines of the permanent magnet rotor of the second embodiment of the motor according to the present invention.

A side view of a second motor 10b according to the present invention is shown in FIG. 22, a cross-sectional view of the second motor 10b is shown in FIG. 23, a more detailed side view of the rotor 16b of the second motor 10b is shown in FIG. 24, a side view of the inductive rotor 20b of the second motor 10b is shown in FIG. 25, a cross-sectional view of the inductive rotor 20b of the second motor 10b taken along line 26-26 of FIG. 25 is shown in FIG. 26, a side view of the permanent magnet rotor 26b of the second motor 10b is shown in FIG. 27A, an end view of the permanent magnet rotor 26b of the second motor 10b is shown in FIG. 27B, a cross-sectional view of the permanent magnet rotor 26b of the second motor 10b taken along line 28-28 of FIG. 27A is shown in FIG. 28, and the stator magnetic field of the second motor 10b is shown in FIG. 29. The motor 10b includes a housing 11, stator windings 14, and stator back iron 16. The inductive rotor 20b includes four air gaps 25 creating four poles and reaching nearly the entire depth of the inductive rotor 20a to avoid flux leakage and extend the stator magnetic field 32 into the permanent magnet rotor 26a. The motor 10a includes a clutch 34a which may be a clutch 34', 34'', 34''', or 34'' but is preferably a clutch 34''.

Figure 31:
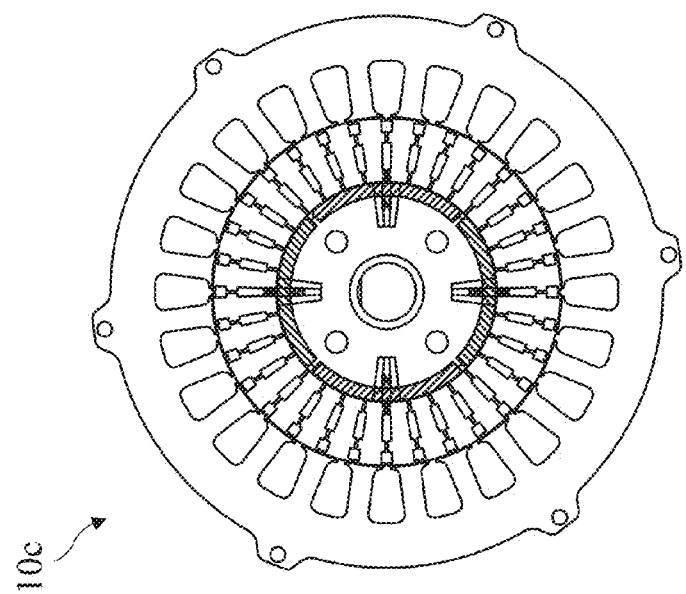
FIG. 31 shows a cross-sectional view of the third embodiment of the motor according to the present invention.
Figure 30:
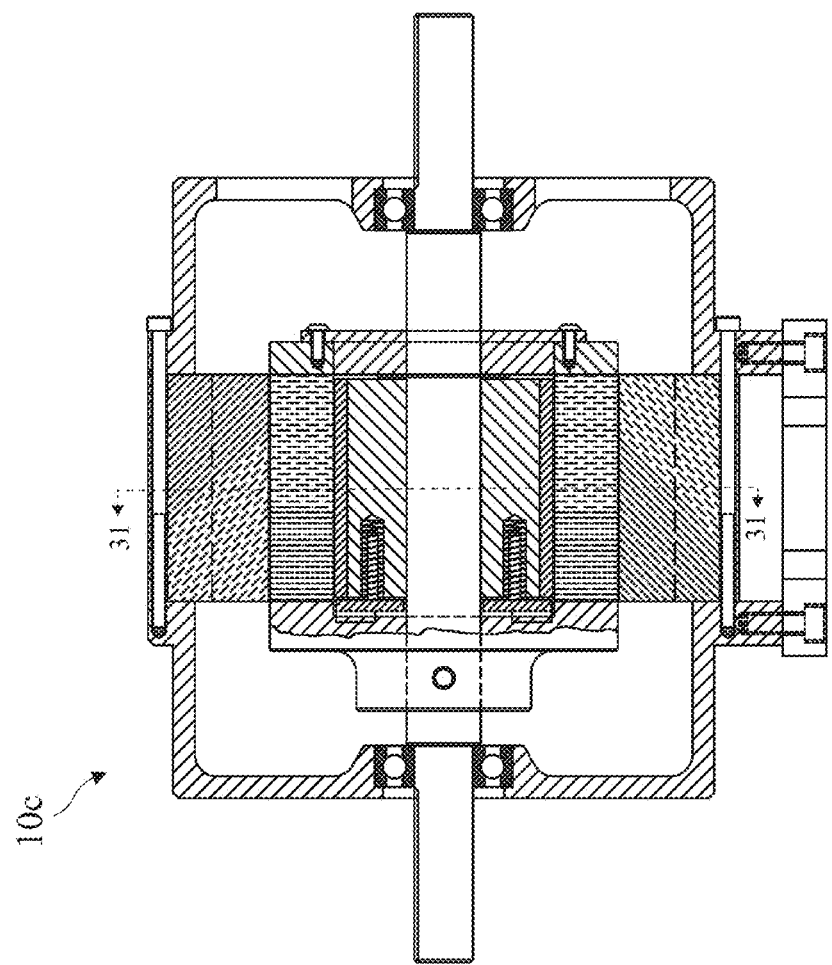
FIG. 30 shows a side view of a third embodiment of the motor according to the present invention.
Figure 32:
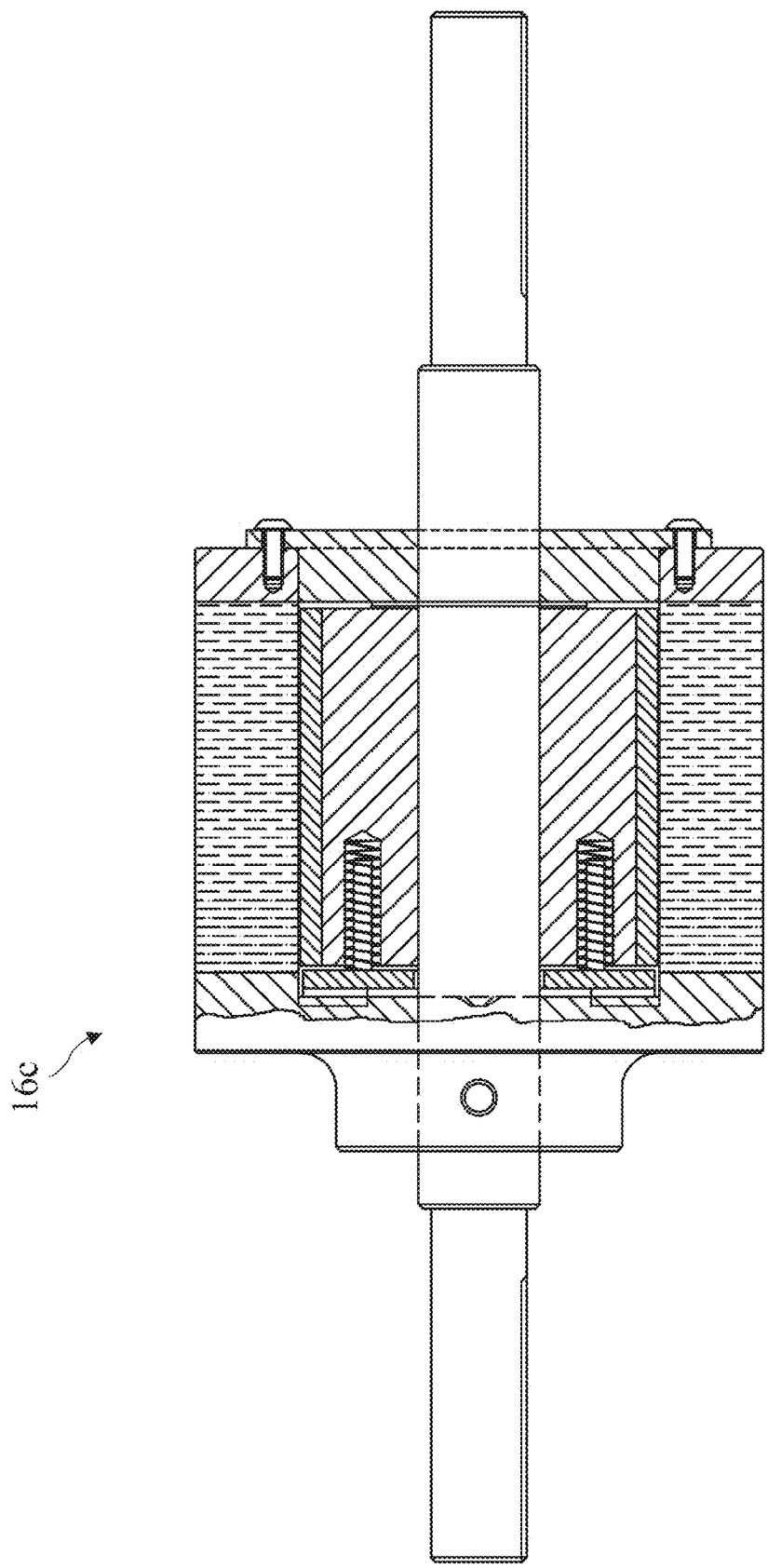
FIG. 32 shows a detailed side view of a third rotor of the third embodiment of the motor according to the present invention.

A side view of a third motor 10c according to the present invention is shown in FIG. 30, a cross-sectional view of the third motor 10c is shown in FIG. 31, a more detailed side view of the rotor 16c of the third motor 10c is shown in FIG.

Figure 34:
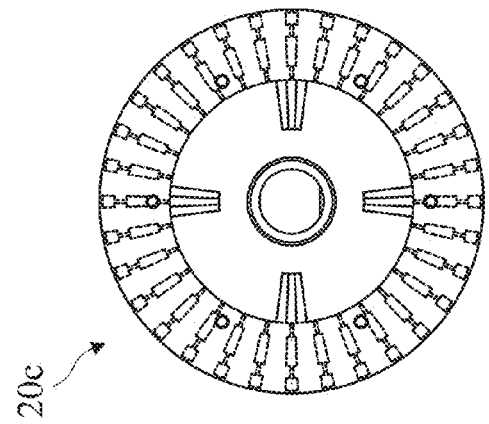
FIG. 34 shows a cross-sectional view of the third inductive rotor of the third embodiment of the motor according to the present invention.
Figure 35A:
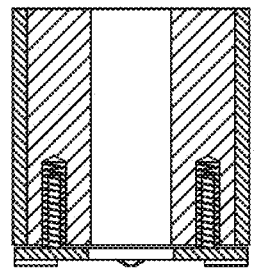
FIG. 35A shows a side view of a third permanent magnet rotor of the third embodiment of the motor according to the present invention.
Figure 35B:
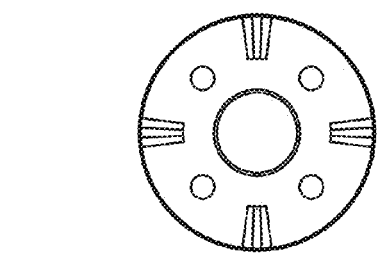
FIG. 35B shows an end view of the third permanent magnet rotor of the third embodiment of the motor according to the present invention.
Figure 33:
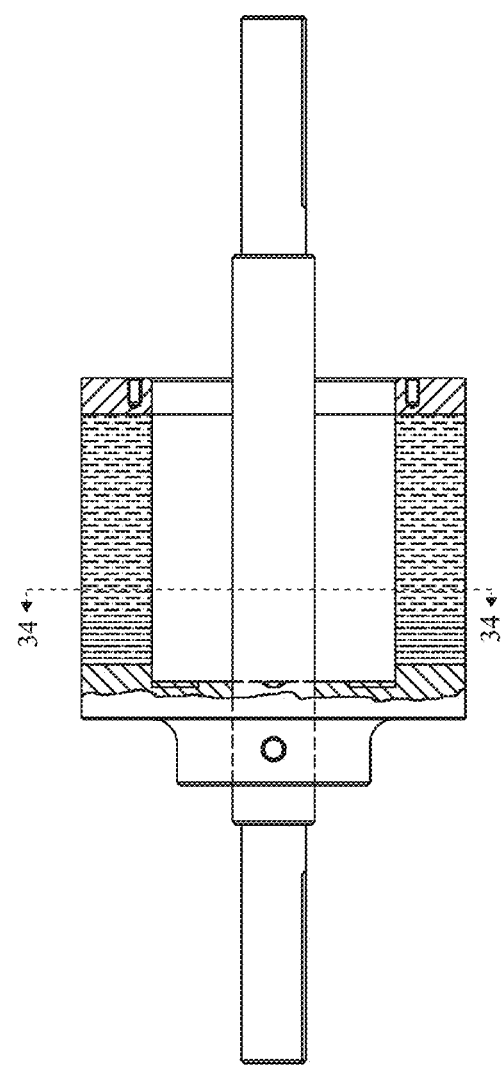
FIG. 33 shows a side view of a third inductive rotor of the third embodiment of the motor according to the present invention.
Figure 36:
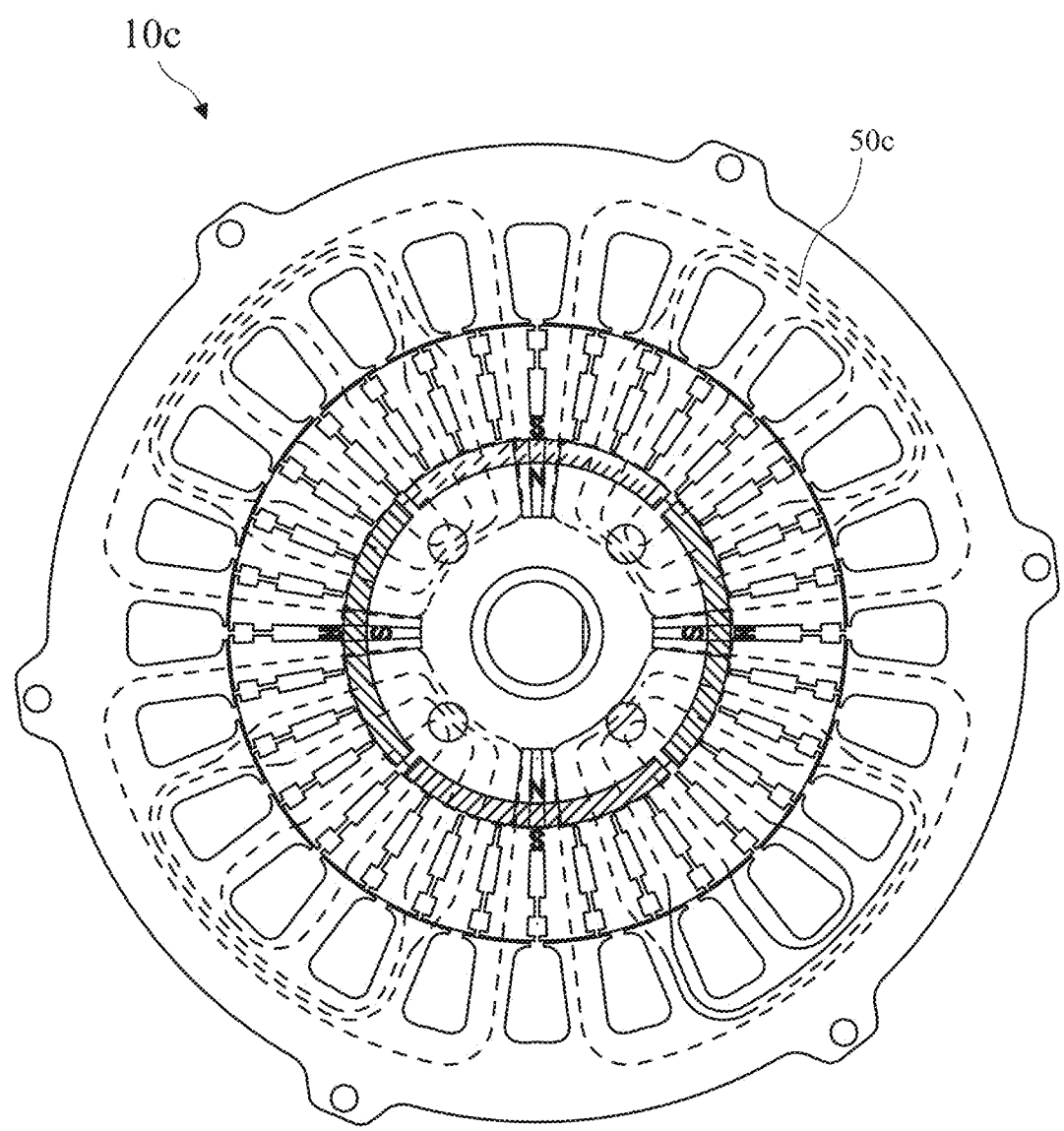
FIG. 36 shows stator magnetic field lines of the permanent magnet rotor of the third embodiment of the motor according to the present invention.

32, a side view of the inductive rotor 20c of the third motor 10c is shown in FIG. 33, a cross-sectional view of the inductive rotor 20c of the third motor 10c taken along line 34-34 of FIG. 33 is shown in FIG. 34, a side view of the permanent magnet rotor 26c of the third motor 10c is shown in FIG. 35A, an end view of the permanent magnet rotor 26c of the third motor 10c is shown in FIG. 35B, and the stator magnetic field 50c of the third motor 10c is shown in FIG. 36. The motor 10c includes a clutch 34c which may be a clutch 34', 34'', 34''', or 34'''' but is preferably a clutch 34''.

Figure 37:
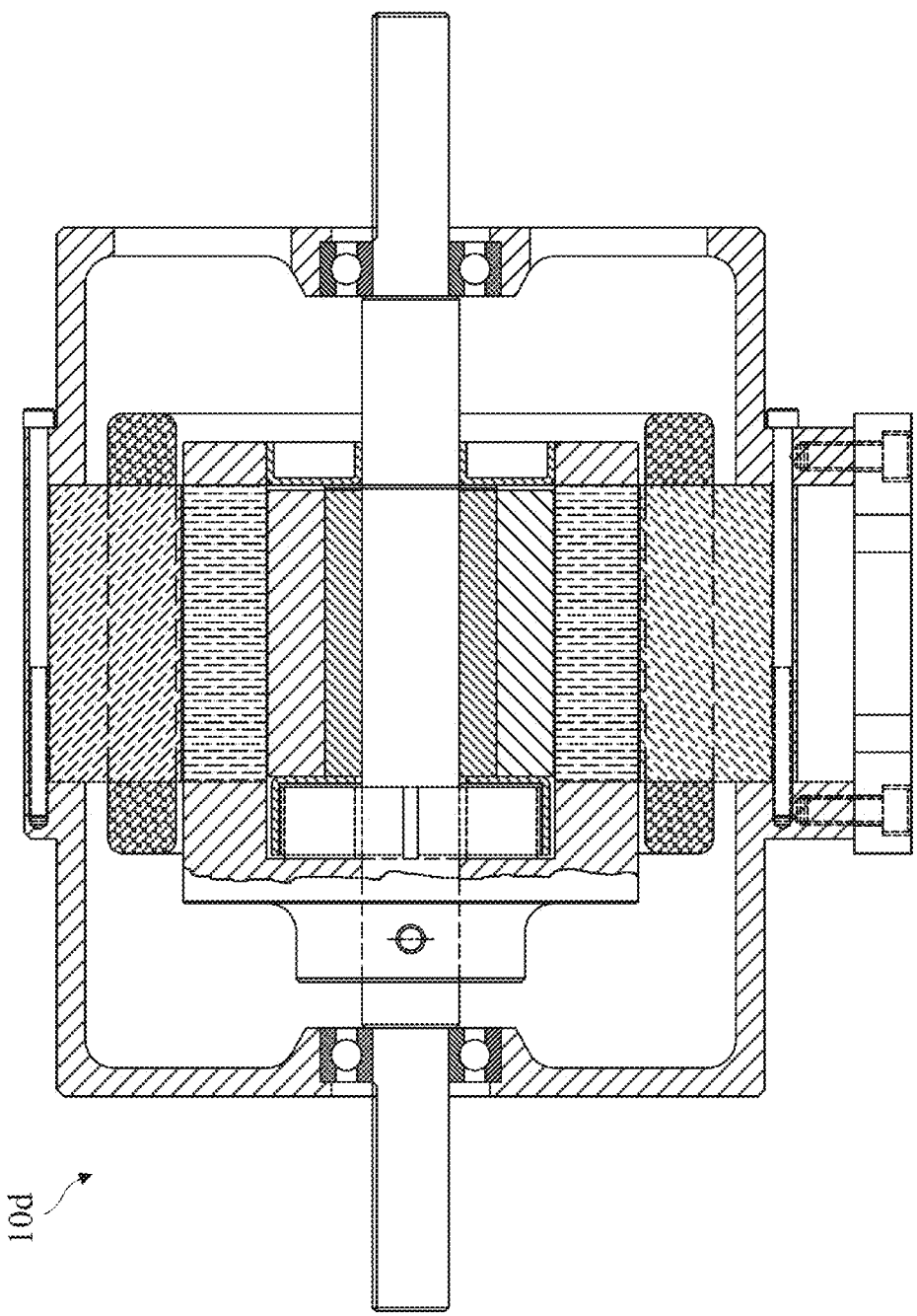
FIG. 37 shows a side view of a fourth embodiment of the motor according to the present invention.
Figure 38:
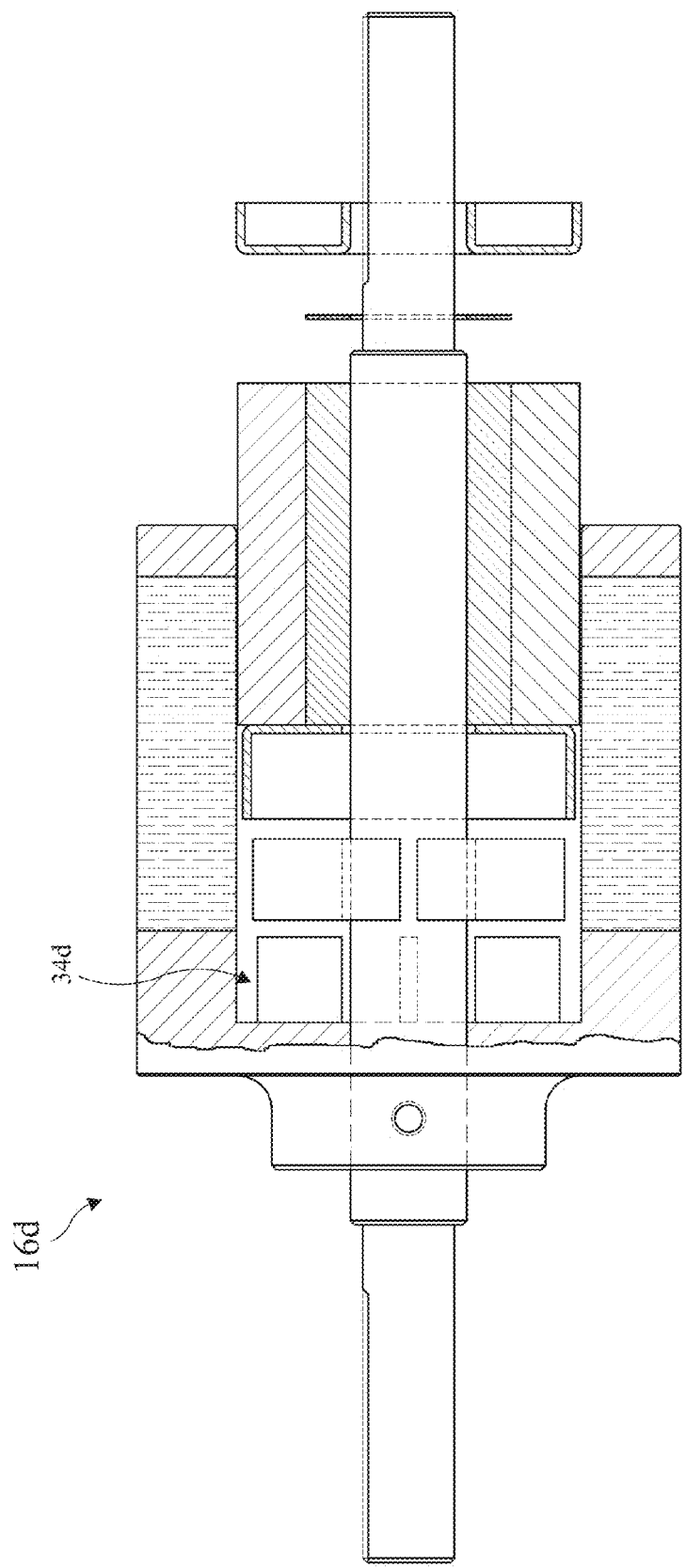
FIG. 38 shows an exploded view of a fourth rotor of the fourth embodiment of the motor according to the present invention.

A side view of a fourth motor 10d according to the present invention is shown in FIG. 37, an exploded side view of the rotor 16d of the fourth motor 10d is shown in FIG. 38, a side view of the inductive rotor 20d of the fourth motor 10d is shown in FIG. 39, a cross-sectional view of the inductive rotor 20d of the fourth motor 10d taken along line 40-40 of FIG. 38 is shown in FIG. 40, a side view of the permanent magnet rotor 26d of the fourth motor 10d is shown in FIG. 41, and a cross-sectional view of the permanent magnet rotor 26d of the fourth motor 10d taken along line 42-42 of FIG. 41 is shown in FIG. 35B. The motor 10d includes a clutch 34d which may be a clutch 34', 34'', 34''', or 34'''' but is preferably a centrifugal clutch 34'''.

A side view of the fourth rotor 16d at low RPM with the centrifugal clutch 34''' slipping is shown in FIG. 43 and a cross-sectional view of the fourth rotor 34''' taken along line 44-44 of FIG. 43 is shown in FIG. 44. The rotational speed 66a is low and only small centrifugal force 68a is created in the weights 62, therefore only lightly coupling the rotation of the permanent magnet rotor 26d with the inductive rotor 20d.

A side view of the fourth rotor 16d at high RPM with the centrifugal clutch 34''' locking is shown in FIG. 45 and a cross-sectional view of the fourth rotor 34''' taken along line 46-46 of FIG. 45 is shown in FIG. 46. The rotational speed 66b is high and large centrifugal force 68b is created in the weights 62, therefore strongly coupling the rotation of the permanent magnet rotor 26d with the inductive rotor 20d.

Figure 48:
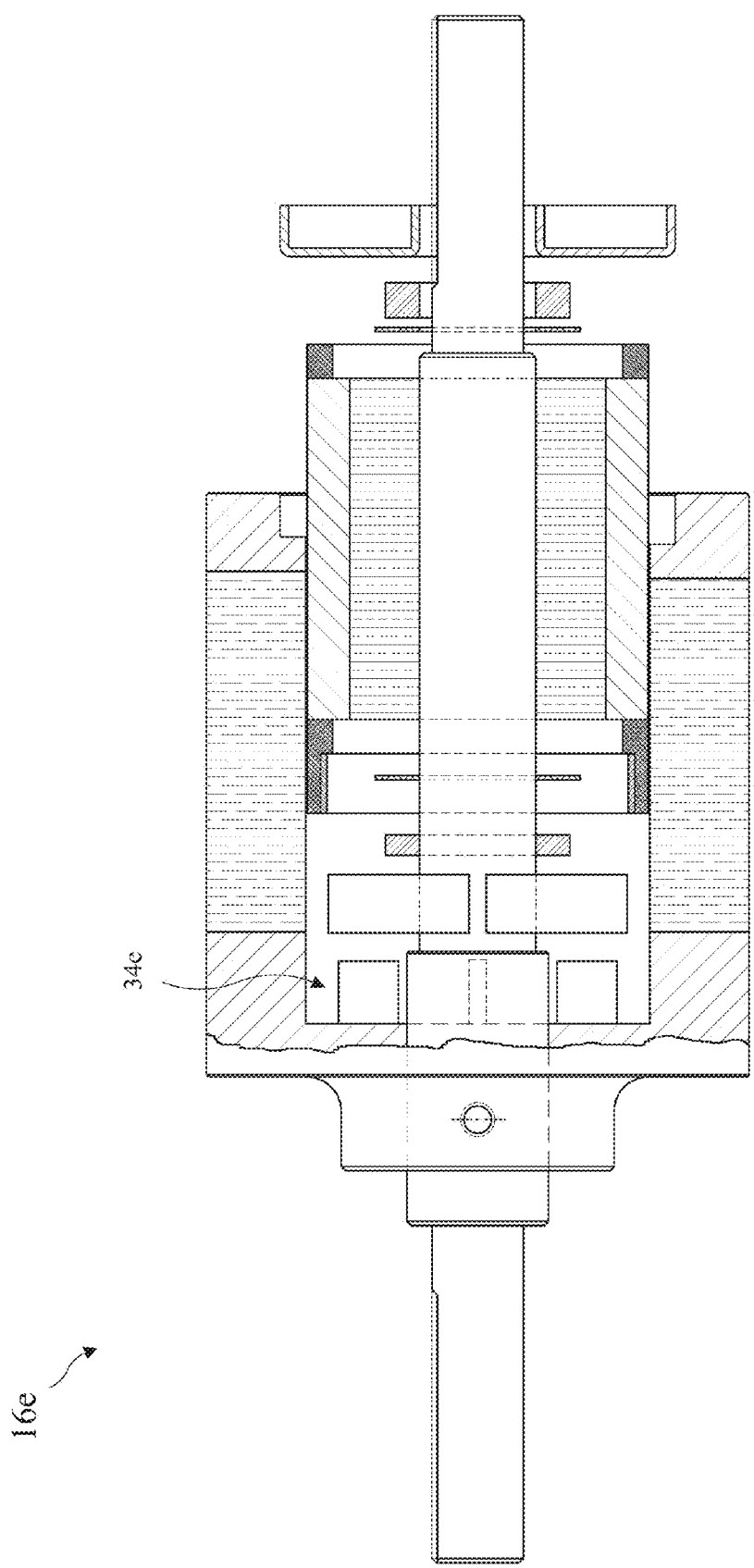
FIG. 48 shows an exploded view of a fifth rotor of the fifth embodiment of the motor according to the present invention.

A side view of a fifth motor 10e according to the present invention is shown in FIG. 47, an exploded side view of the fifth rotor 16e of the fifth motor 10e is shown in FIG. 48, a side view of the fifth inductive rotor 20e of the fifth motor 10e is shown in FIG. 49, a cross-sectional view of the fifth inductive rotor 20e of the fifth motor 10e taken along line 50-50 of FIG. 49 is shown in FIG. 50, a side view of the fifth permanent magnet rotor 26e, which includes bars 22e, of the fifth motor 10e is shown in FIG. 51, and a cross-sectional view of the permanent magnet rotor 26e of the fifth motor 10e taken along line 52-52 of FIG. 51 is shown in FIG. 52. The bars 22e assist in the initial angular acceleration of the permanent magnet rotor 26e and in approaching synchronous RPM. The motor 10e includes a clutch 34e which may be a clutch 34', 34'', 34''', or 34'''' but is preferably a centrifugal clutch 34'''.

Figure 53:
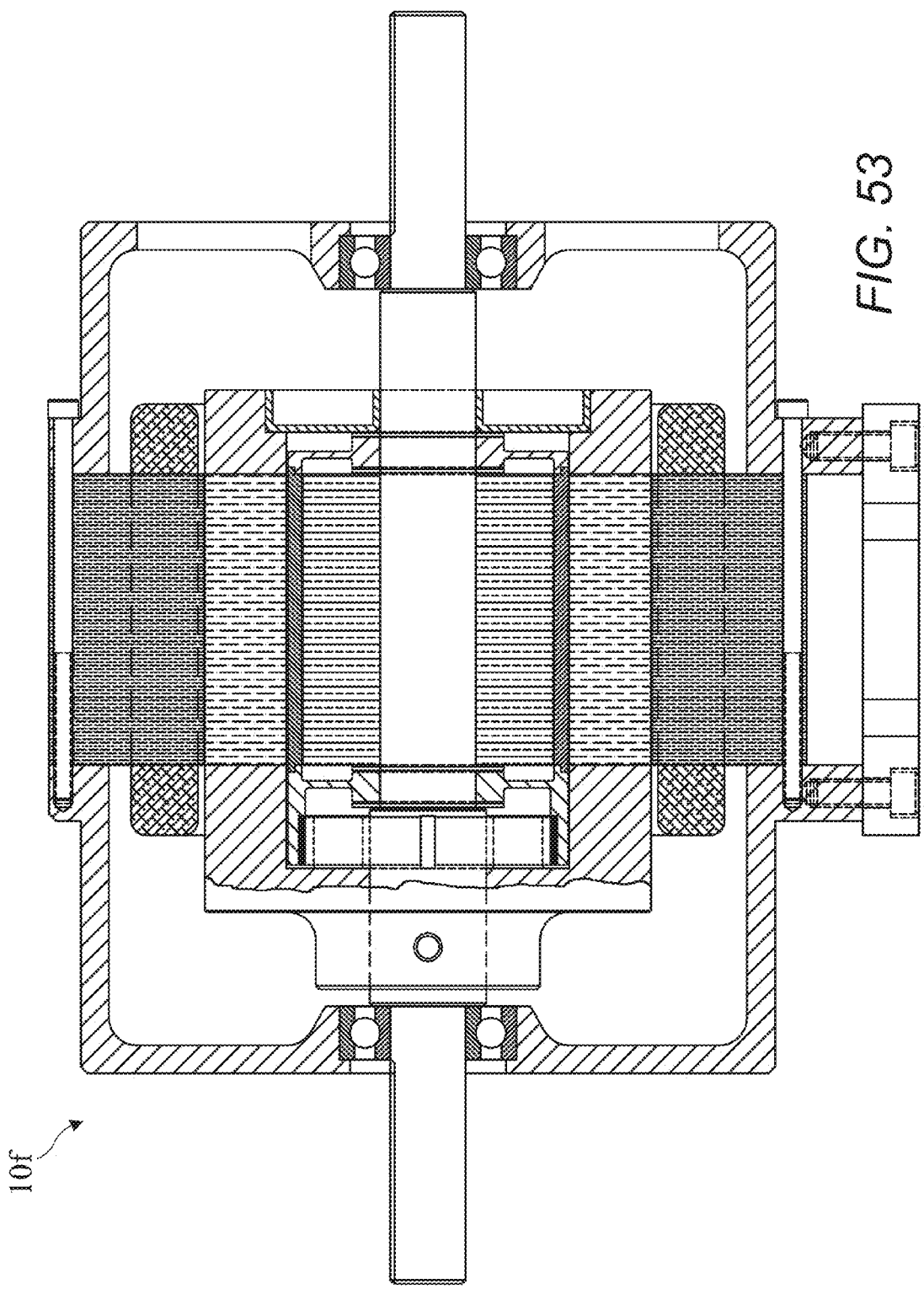
FIG. 53 shows a side view of a sixth embodiment of the motor according to the present invention.
Figure 54:
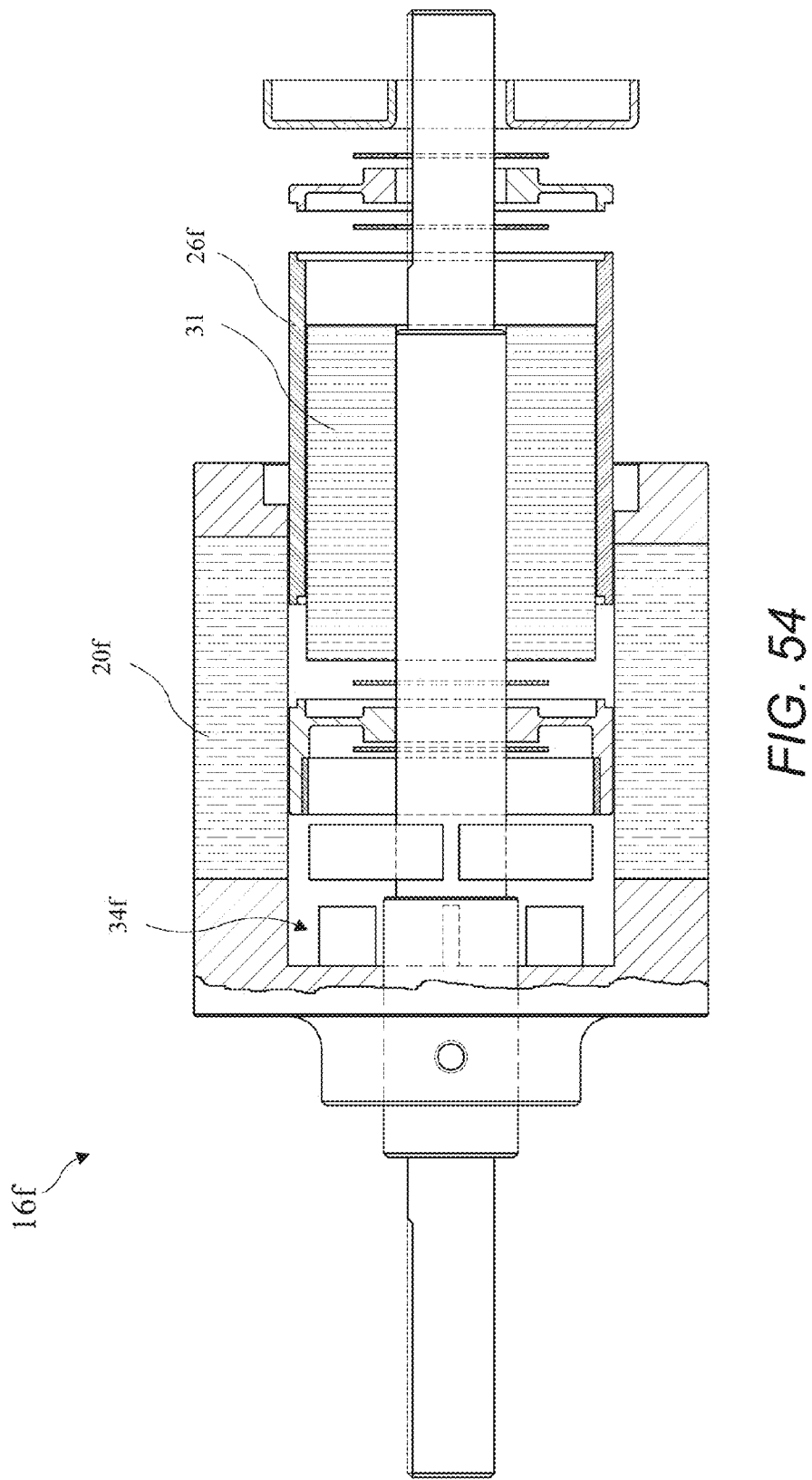
FIG. 54 shows an exploded view of a sixth rotor of the sixth embodiment of the motor according to the present invention.
Figure 56:
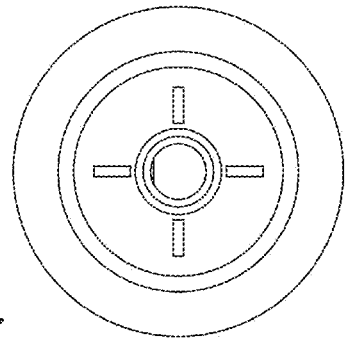
FIG. 56 shows a cross-sectional view of the sixth inductive rotor of the sixth embodiment of the motor according to the present invention taken along line 56-56 of FIG. 55.
Figure 58:
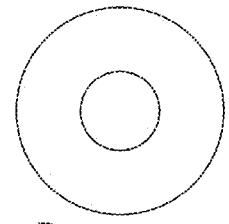
FIG. 58 shows a cross-sectional view of the core laminate of the sixth embodiment of the motor according to the present invention taken along line 58-58 of FIG. 57.
Figure 57:
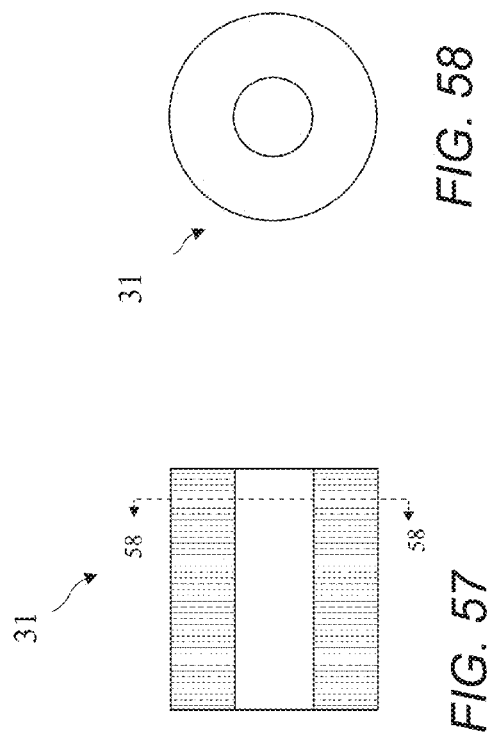
FIG. 57 shows a side view of a core laminate of the sixth embodiment of the motor according to the present invention.
Figure 55:
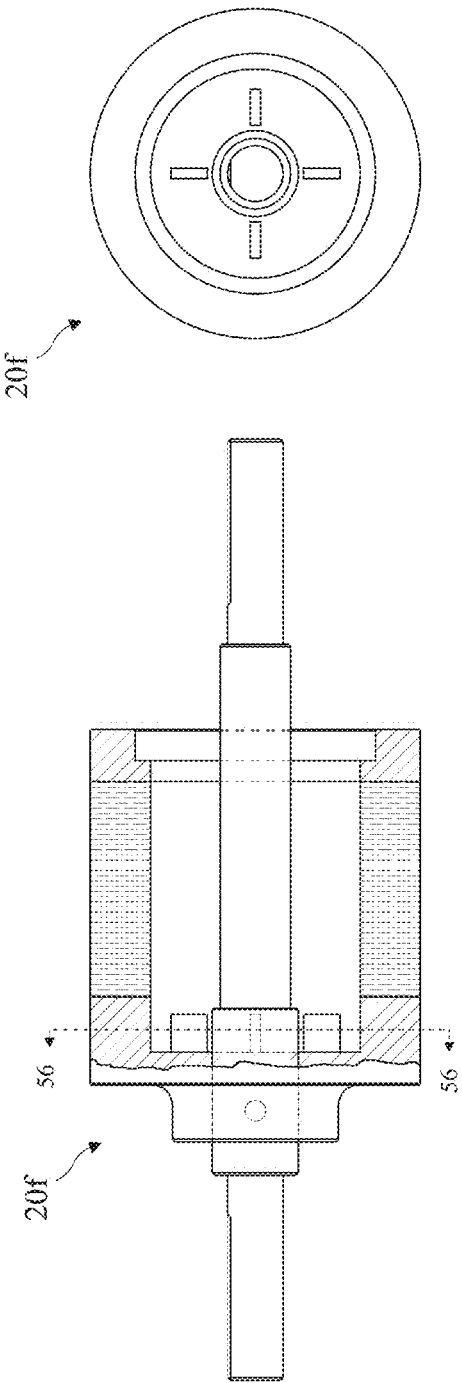
FIG. 55 shows a side view of a sixth inductive rotor of the sixth embodiment of the motor according to the present invention.
Figure 61:
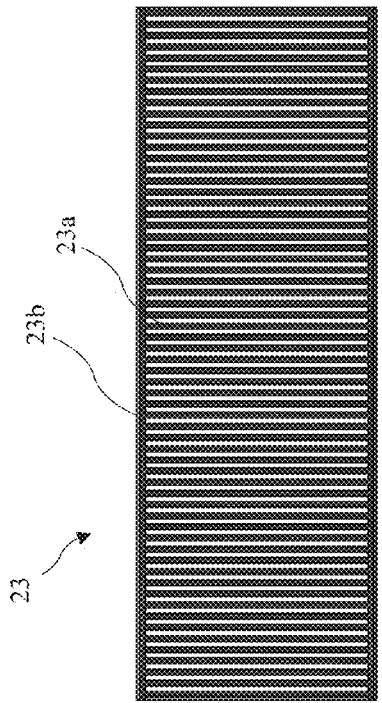
FIG. 61 shows the inductive strip unwrapped according to the present invention.
Figure 59B:
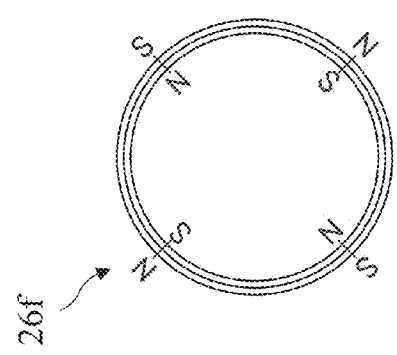
FIG. 59B shows an end view of the sixth permanent magnet rotor of the sixth embodiment of the motor according to the present invention.
Figure 60:
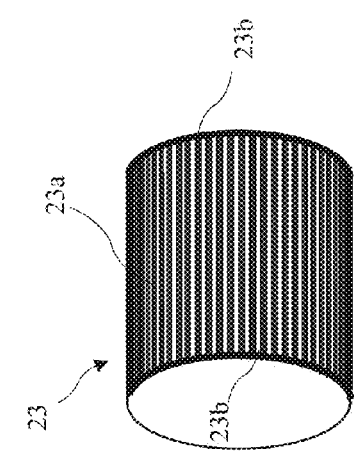
FIG. 60 shows a perspective view of an inductive strip for wrapping around the sixth permanent magnet rotor of the sixth embodiment of the motor according to the present invention.
Figure 59A:
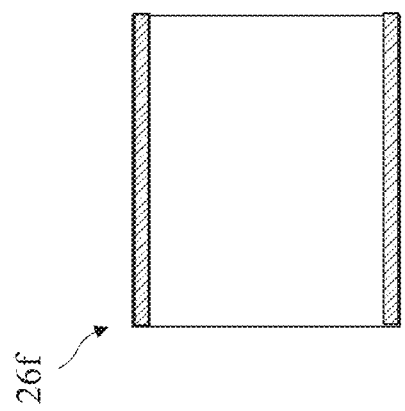
FIG. 59A shows a side view of a sixth permanent magnet rotor of the sixth embodiment of the motor according to the present invention.

A side view of a sixth motor 10f according to the present invention is shown in FIG. 53, an exploded side view of the sixth rotor 16f of the sixth motor 10f is shown in FIG. 54, a side view of the sixth inductive rotor 20f of the sixth motor 10f is shown in FIG. 55, a cross-sectional view of the sixth inductive rotor 20f of the sixth motor 10f taken along line 56-56 of FIG. 55 is shown in FIG. 56, a side view of a core laminate 31 is shown in FIG. 57 and a cross-sectional view of the core laminate 31 is shown in FIG. 58, a side view of the sixth permanent magnet rotor 26f of the sixth motor 10f is shown in FIG. 59A, an end view of the permanent magnet rotor 26f of the sixth motor 10f is shown in FIG. 59B, a perspective view of an inductive strip 23 for wrapping around the sixth permanent magnet rotor of the sixth embodiment of the motor according to the present invention is shown in FIG. 60, and the inductive strip 23 unwrapped is shown in FIG. 61. The core laminate 31 is fixed to the motor shaft 32 and the permanent magnet 26f rotates around the core laminate 31. The inductive strip 23 includes spaced apart conducting stripes 23a all electrically connected to conducting rings 23b at each end of the inductive strip 23. An embodiment of the inductive strip 23 is a copper strip adhered to the ring magnet. The thickness of copper strip is preferably between 0.015 and 0.020 inches, keeping the air gap to a minimum but allowing a good eddy current affect to quickly draw the permanent magnet rotor to synchronism RPM leaving the outer inductive rotor to accelerate under load allowing the clutch to pull the inductive rotor to final synchronous RPM. The permanent magnet rotor 26f is a simple ring magnet variably coupled to the inductive rotor as described above. The motor 10f includes a clutch 34e which may be a clutch 34', 34'', 34''', or 34'' but is preferably a centrifugal clutch 34'''.

Figure 62:
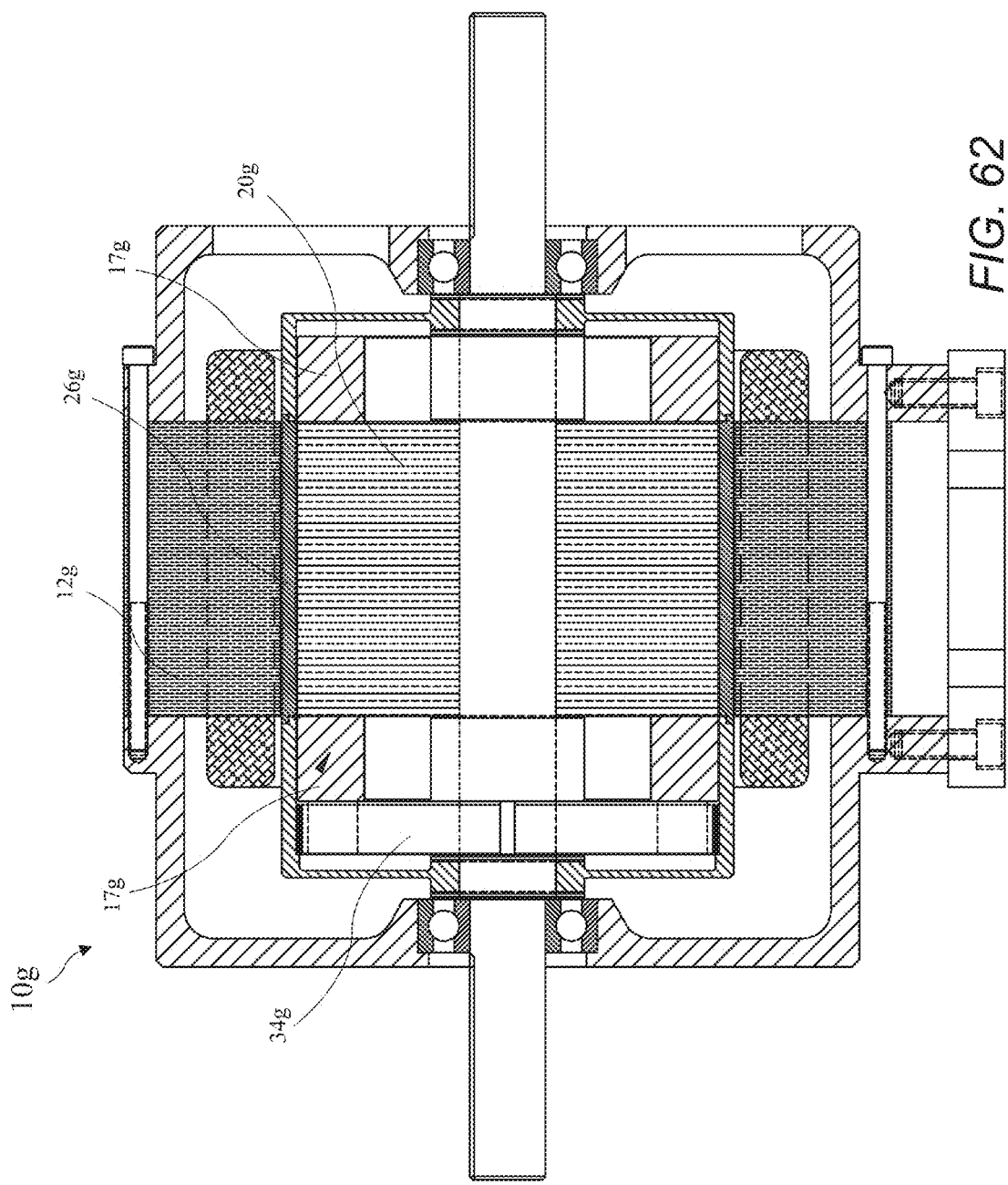
FIG. 62 shows a side view of a seventh embodiment of the motor according to the present invention.

A side view of a seventh embodiment of the motor 10g according to the present invention is shown in FIG. 62. The motor 10g includes a stator 12g, a permanent magnet rotor 26g, an inductive rotor 20g, cage rotor end rings 17g, and a clutch 34g. The permanent magnet rotor 26g is a ring magnet having a copper outer wrap.

Figure 63:
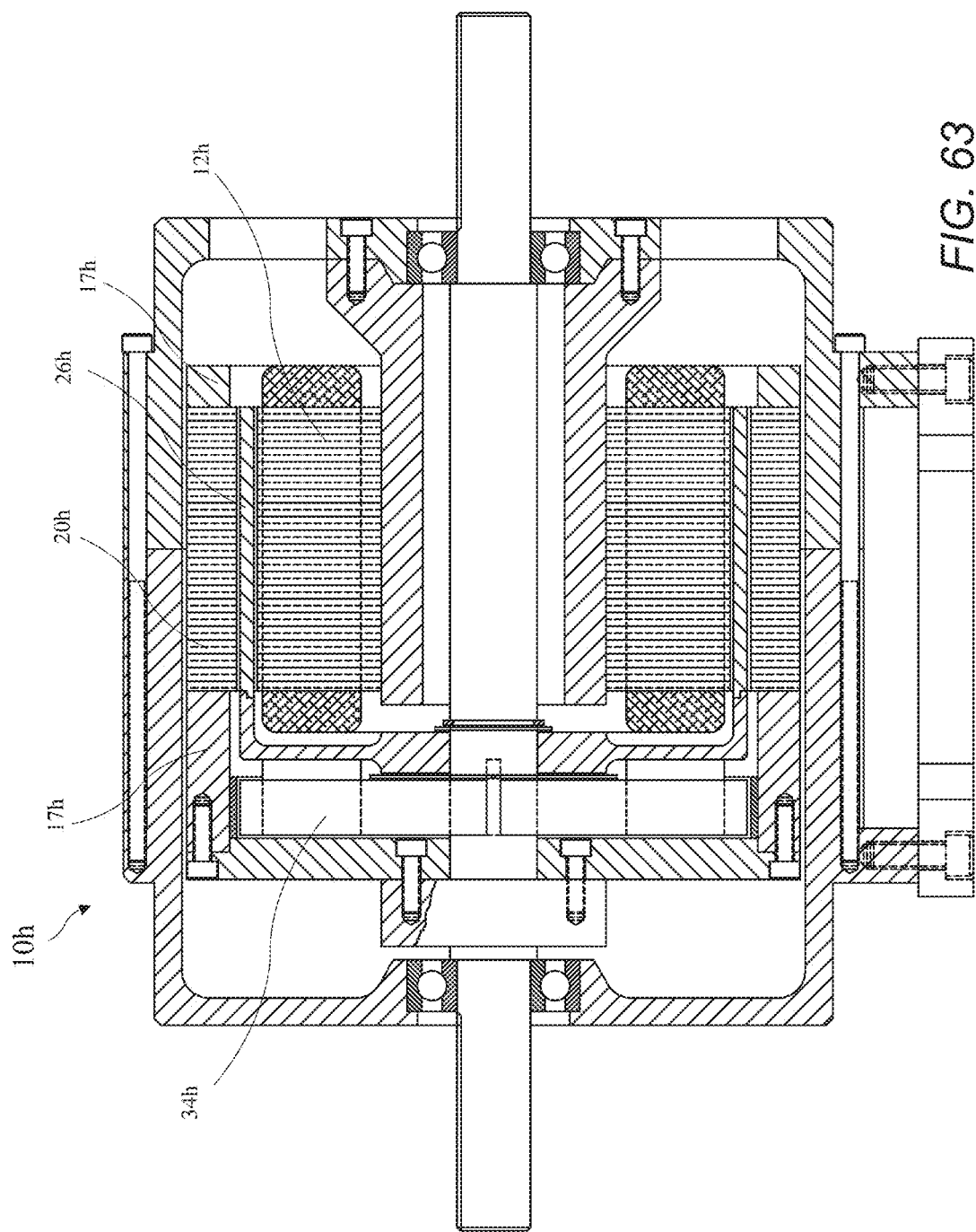
FIG. 63 shows a side view of a eighth embodiment of the motor according to the present invention.

A side view of an eighth embodiment of the motor 10h according to the present invention is shown in FIG. 63. The motor 10h includes a stator 12h, a permanent magnet rotor 26h, an inductive rotor 20h, cage rotor end rings 17h, and a clutch 34h. The permanent magnet rotor 26h is a ring magnet having a copper inner wrap. The motor 10h has an internal stator 12h and the inductive rotor 20h and permanent magnet rotor 26h are outside the stator 12h. The clutch 34h is inside the cage rotor end rings 17h.

Figure 64:
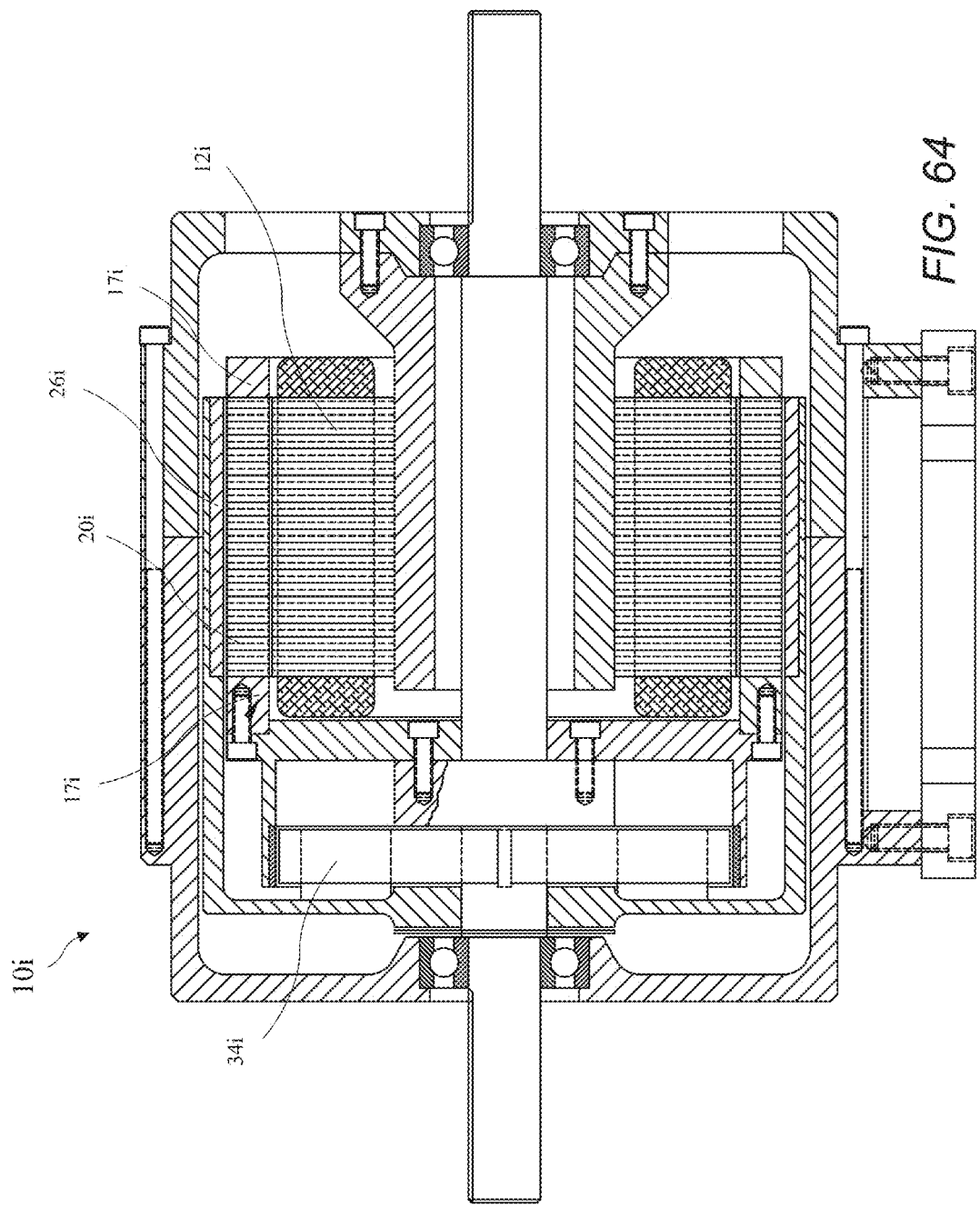
FIG. 64 shows a side view of a ninth embodiment of the motor according to the present invention.

A side view of a ninth embodiment of the motor 10i according to the present invention is shown in FIG. 64. The motor 10i includes a stator 12i, a permanent magnet rotor 26i, an inductive rotor 20i, cage rotor end rings 17i, and a clutch 34i. The permanent magnet rotor 26i is a ring magnet having a copper inner wrap. The motor 10h has an internal stator 12i and the inductive rotor 20i and permanent magnet rotor 26i are outside the stator 12i. The clutch 34i is outside the cage rotor end rings 17i.

Figure 65:
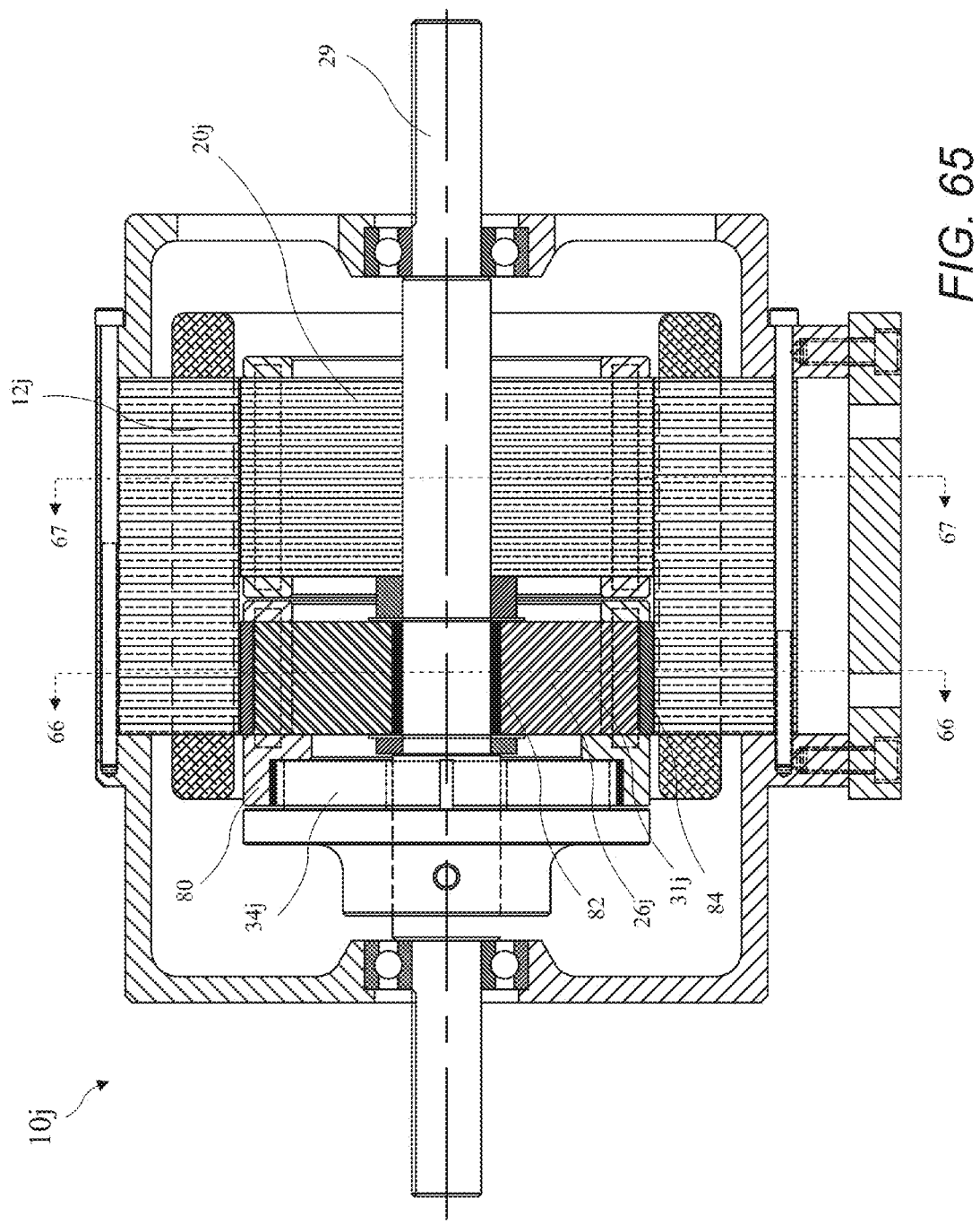
FIG. 65 shows a side view of a tenth embodiment of the motor according to the present invention.
Figure 66:
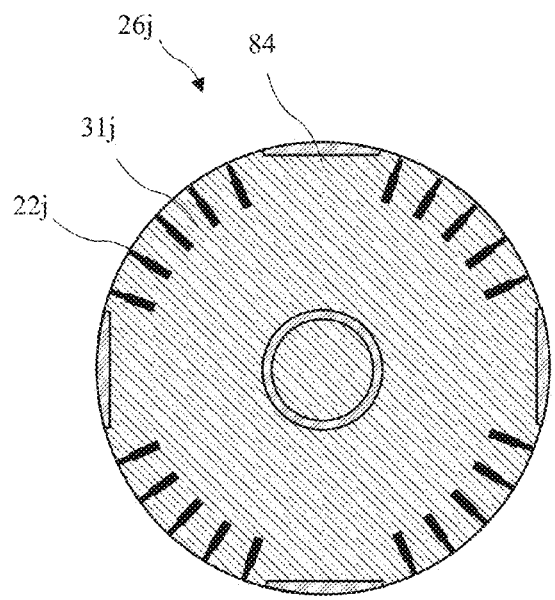
FIG. 66 shows a cross-sectional view of an independently rotating permanent magnet rotor, including bars, of the tenth embodiment motor according to the present invention taken along line 66-66 of FIG. 65.
Figure 67:
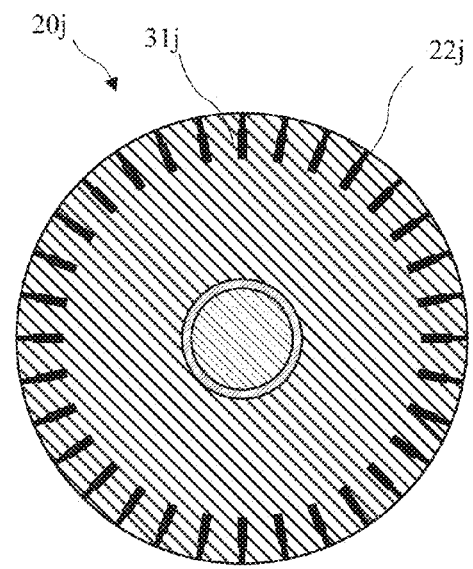
FIG. 67 shows a cross-sectional view of an induction rotor of the tenth embodiment motor according to the present invention taken along line 67-67 of FIG. 65.

A side view of a tenth embodiment of the motor 10j according to the present invention is shown in FIG. 65, a cross-sectional view of an independently rotating permanent magnet rotor 26j of the motor 10j taken along line 66-66 of FIG. 65 is shown in FIG. 66, and a cross-sectional view of an inductive rotor 20j of the motor 10j taken along line 67-67 of FIG. 65 is shown in FIG. 67. The motor 10j includes a stator 12j, the inductive rotor 20j rotationally fixed to the motor shaft 29, the independently rotating permanent magnet rotor 26j co-axial with the shaft 29 through a bushing or bearing 82, and a clutch 34j coupling the independently rotating permanent magnet rotor 26j to the shaft 29. The inductive rotor 20j and the independently rotating permanent magnet rotor 26j are axially displaced as contrasted to radially displaced in motors 10a-10i.

The independently rotating permanent magnet rotor 26j includes permanent magnets (for example, ring magnets) 84 for synchronous operation, and includes bars 22j. The bars 22j help start the permanent magnet rotor 26j in direction of rotating stator flux independent of permanent magnets 84 coupling to the independently rotating permanent magnet rotor 26j to the rotating stator flux. Further, in a two pole 60 Hz motor, the rotating stator flux frequency is 3,600 rpm, even though the independently rotating permanent magnet rotor 26j has very low inertial mass and may start on its own, skipping could occur. The rotor bars 22j in the independently rotating permanent magnet rotor 26j, help accelerate the independently rotating permanent magnet rotor 26j in the event of such skipping, accelerating the independently rotating permanent magnet rotor 26j until the permanent magnet 84 flux couples to the rotating stator flux bringing the independently rotating permanent magnet rotor 26j to synchronous speed.

In an alternative embodiment, the independently rotating permanent magnet rotor 26j may include an inductive strip 23 described above wrapped around the independently rotating permanent magnet rotor 26j replacing the bars 22j. A perspective view of the inductive strip 23 is shown in FIG. 60, and the inductive strip 23 unwrapped is shown in FIG. 61. The inductive strip 23 may be a copper or nonferrous band, and provides the same benefit at startup as the rotor bars 22j. Both the rotor bars 22j and the inductive strip 23 induce an inductive magnetic field, the inductive strip 23 creating eddy current, and the rotor bars create magnetic flux, both cooperating with stating stator fluxes.

The motor 10j includes the clutch 34j which may be a clutch 34', 34'', 34''', or 34'' but is preferably a centrifugal clutch 34'''. The centrifugal clutch 34''' operates as described in FIGS. 44 and 46.

Figure 68:
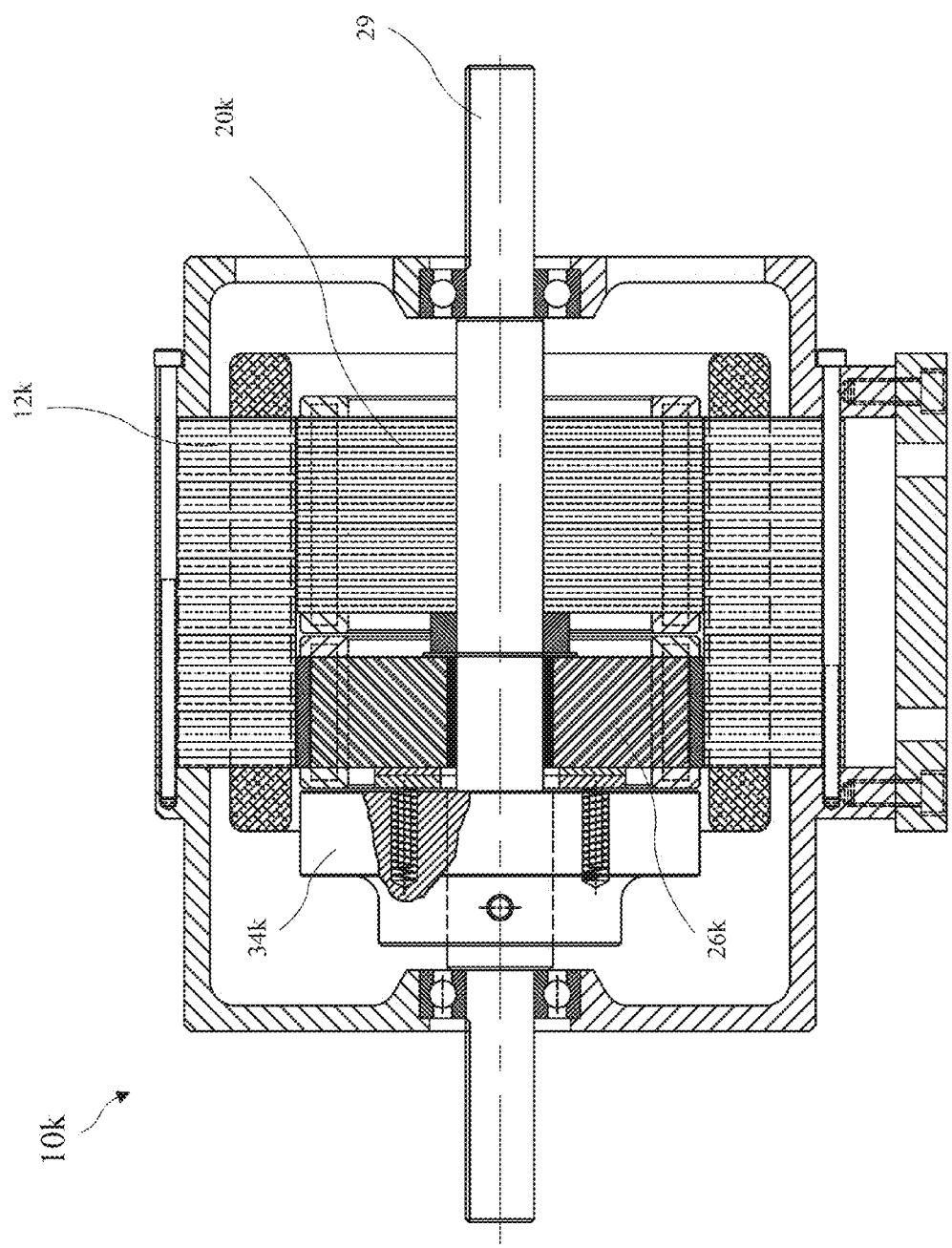
FIG. 68 shows a side view of an eleventh embodiment of the motor according to the present invention.

An eleventh embodiment of the motor 10k according to the present invention is shown in FIG. 68. The induction rotor, permanent magnet rotor, and stator are as in the motor 10j, but the centrifugal clutch of the motor 10j is replaced by the slip clutch 34'.

While the invention herein disclosed has been described by means of specific embodiments and applications thereof, numerous modifications and variations could be made thereto by those skilled in the art without departing from the scope of the invention set forth in the claims.

I claim:

1. A hybrid permanent magnet/induction motor, starting as an induction motor and transitioning to synchronous operation, the motor comprising:
    a motor shaft;
    a fixed stator creating a rotating stator magnetic field;
    a rotating rotor comprising:
        an inductive rotor co-axially fixed to the motor shaft and including a squirrel cage to induce current; and
        a permanent magnet rotor residing coaxially with the motor shaft and axially displaced from the inductive rotor and variably rotationally coupled to the motor shaft allowing the permanent magnet rotor to rotate independently of the motor shaft at startup and low speed and increasing coupling with the motor shaft as the permanent magnet rotor approaches synchronous speed, the permanent magnet rotor and inductive rotor residing sequentially end to end on the motor shaft, not overlapping;
    wherein the stator magnetic field cooperates with the squirrel cage to induce current in the inductive rotor whenever the rotation of the inductive rotor is not in sync with the rotation of the stator magnetic field and the stator magnetic field cooperates with the permanent magnet rotor to accelerate the rotation of the permanent magnet rotor to be in sync with the rotation of the stator magnetic field.

2. The hybrid permanent magnet/induction motor of claim 1, wherein the coupling between the permanent magnet rotor and the motor shaft approaches a fixed coupling as the motor shaft and the permanent magnet rotor both approach synchronous RPM.

3. The hybrid permanent magnet/induction motor of claim 2, wherein the coupling between the permanent magnet rotor and the motor shaft becomes a fixed coupling when the motor shaft and the permanent magnet rotor reach synchronous RPM.

4. The hybrid permanent magnet/induction motor of claim 2, wherein the permanent magnet rotor and the inductive rotor are coupled by an electrically operated clutch.

5. The hybrid permanent magnet/induction motor of claim 4, wherein the coupling between the permanent magnet rotor and the motor shaft is an electro-mechanical clutch decreasing the coupling between the permanent magnet rotor and the motor shaft when slippage between inductive bars in the inductive rotor and the stator magnetic field is large at startup.

6. The hybrid permanent magnet/induction motor of claim 2, wherein the coupling between the permanent magnet rotor and the motor shaft is a centrifugal clutch.

7. The hybrid permanent magnet/induction motor of claim 6, wherein the centrifugal clutch increases the coupling between the permanent magnet rotor and the motor shaft as the speed of the inductive rotor increases.

8. The hybrid permanent magnet/induction motor of claim 7, wherein weights in the centrifugal clutch rotate with the inductive rotor.

9. The hybrid permanent magnet/induction motor of claim 8, wherein the centrifugal clutch comprises:
    an outer bell portion rotationally fixed to the permanent magnet rotor; and
    an inner mass portion including a plurality of masses rotationally fixed to the inductive rotor and radially free to contact the outer bell portion and exerting force against the outer bell to couple the rotation of the inductive rotor to the permanent magnet rotor as the inductive rotor approaches synchronous rotational speed.

10. The hybrid permanent magnet/induction motor of claim 2, wherein the coupling between the permanent magnet rotor and the motor shaft is a slip clutch allowing the permanent magnet rotor to quickly accelerate at startup.

11. The hybrid permanent magnet/induction motor of claim 10, wherein the slip clutch is a discrete position slip clutch providing discrete angular positions of rotational alignment between the permanent magnet rotor and the inductive rotor.

12. The hybrid permanent magnet/induction motor of claim 10, wherein the slip clutch is a continuous position slip clutch providing a continuous angular range of positions of rotational alignment between the permanent magnet rotor and the inductive rotor.

13. The hybrid permanent magnet/induction motor of claim 1, wherein the permanent magnet rotor include inductive bars cooperating with the rotating stator magnetic field at startup to accelerate the permanent magnet rotor.

14. The hybrid permanent magnet/induction motor of claim 1, wherein the permanent magnet rotor include an inductive strip cooperating with the rotating stator magnetic field at startup to accelerate the permanent magnet rotor.

15. The hybrid permanent magnet/induction motor of claim 14, wherein the inductive strip is wrapped around the permanent magnet rotor.

16. The hybrid permanent magnet/induction motor of claim 15, wherein the inductive strip includes spaced apart conducting stripes all electrically connected to conducting rings at each end of the inductive strip.

17. The hybrid permanent magnet/induction motor of claim 15, wherein the permanent magnet is a ring permanent magnet and an inductive strip includes spaced apart conducting stripes, electrically connected to conducting rings at each end of the inductive strip, is wrapped around the ring magnet providing inductively generated torque to initially accelerate the ring permanent magnet rotor.

18. The hybrid permanent magnet/induction motor of claim 17, wherein the inductive strip is a copper strip between 0.015 and 0.020 inches thick.

19. A hybrid permanent magnet/induction motor, starting as an induction motor and transitioning to synchronous operation, the motor comprising:
   a motor shaft;
   a fixed stator creating a rotating stator magnetic field;
   a rotating rotor comprising:
      an inductive rotor co-axially fixed to the motor shaft and including a squirrel cage to induce current; and
      a permanent magnet rotor coaxially with the motor shaft and axially displaced from the inductive rotor and variably rotationally coupled to the motor shaft allowing the permanent magnet rotor to rotate independently of the motor shaft when the inductive rotor is rotating at low RPM and to increasingly couple the permanent magnet rotor to the motor shaft as the inductive rotor approaches synchronous RPM,
   wherein the stator magnetic field cooperates with the squirrel cage to induce current in the inductive rotor whenever the rotation of the inductive rotor is not in sync with the rotation of the stator magnetic field and the stator magnetic field cooperates with the permanent magnet rotor to accelerate the rotation of the permanent magnet rotor to be in sync with the rotation of the stator magnetic field.

20. A hybrid permanent magnet/induction motor, starting as an induction motor and transitioning to synchronous operation, the motor comprising:
   a motor shaft;
   a fixed stator creating a rotating stator magnetic field;
   a rotating rotor coaxial with the motor shaft and comprising:
      an inductive rotor fixed to the motor shaft and including a squirrel cage to induce current; and
      a permanent magnet rotor coaxially with and axially displaced from the inductive rotor and variably rotationally coupled to the inductive rotor through a centrifugal clutch allowing the permanent magnet rotor to rotate independently of the inductive rotor when the inductive rotor is rotating at low RPM and to increasingly couple the permanent magnet rotor to the inductive rotor as the inductive rotor approaches synchronous RPM at startup and low speed and increasing coupling with the motor shaft as the permanent magnet rotor approaches synchronous speed, the permanent magnet rotor and inductive rotor residing sequentially end to end on the motor shaft, not overlapping,
   wherein the stator magnetic field cooperates with the squirrel cage to induce current in the inductive rotor whenever the rotation of the inductive rotor is not in sync with the rotation of the stator magnetic field, and the stator magnetic field cooperates with the permanent magnet rotor to accelerate the rotation of the permanent magnet rotor to be in sync with the rotation of the stator magnetic field.

* * * * *